US012183356B2

(12) United States Patent
Craven et al.

(10) Patent No.: US 12,183,356 B2
(45) Date of Patent: Dec. 31, 2024

(54) DIGITAL ENCAPSULATION OF AUDIO SIGNALS

(71) Applicant: MQA LIMITED, London (GB)

(72) Inventors: Peter Graham Craven, Haslemere (GB); John Robert Stuart, Cambridge (GB)

(73) Assignee: LENBROOK INDUSTRIES LIMITED, Pickering (CA)

( * ) Notice: Subject to any disclaimer, the term of this patent is extended or adjusted under 35 U.S.C. 154(b) by 0 days.

(21) Appl. No.: 18/332,148

(22) Filed: Jun. 9, 2023

(65) Prior Publication Data

US 2024/0029749 A1 Jan. 25, 2024

Related U.S. Application Data

(60) Division of application No. 17/120,889, filed on Dec. 14, 2020, now Pat. No. 11,710,493, which is a continuation of application No. 16/149,651, filed on Oct. 2, 2018, now Pat. No. 10,867,614, which is a division of application No. 15/317,794, filed as (Continued)

(51) Int. Cl.

| | |
|---|---|
| ***G10L 19/26*** | (2013.01) |
| ***G10L 19/02*** | (2013.01) |
| ***G10L 19/022*** | (2013.01) |
| ***G10L 19/03*** | (2013.01) |
| ***G10L 21/038*** | (2013.01) |

(52) U.S. Cl.

CPC .......... *G10L 19/26* (2013.01); *G10L 19/0204* (2013.01); *G10L 19/022* (2013.01); *G10L 19/03* (2013.01); *G10L 21/038* (2013.01)

(58) Field of Classification Search

CPC ... G10L 19/26; G10L 19/0204; G10L 19/022; G10L 19/03; G10L 21/038

See application file for complete search history.

(56) References Cited

U.S. PATENT DOCUMENTS 4,961,160 A * 10/1990 Sato .......................... G10L 19/08 708/301

5,654,952 A 8/1997 Suzuki et al.

(Continued)

FOREIGN PATENT DOCUMENTS

| | | | |
|---|---|---|---|
| EP | 0933889 | A1 | 4/1999 |
| WO | 20000057549 | A1 | 9/2000 |
| WO | 20150189533 | A1 | 6/2014 |

OTHER PUBLICATIONS

Ferrer Arnau, Luis Jorge, et al. "Decimator filter based on B-splines." Proceedings 19th IMEKO TC-4, Barcelona, Spain Universitat Politècnica de Catalunya Jul. 18 and 19, 2013. 2013. (Year: 2013).*

(Continued)

*Primary Examiner* — Brian L Albertalli

(74) *Attorney, Agent, or Firm* — Buckley, Maschoff & Talwalkar LLC

(57) ABSTRACT

Encoding and decoding systems are described for the provision of high quality digital representations of audio signals with particular attention to the correct perceptual rendering of fast transients at modest sample rates. This is achieved by optimising downsampling and upsampling filters to minimise the length of the impulse response while adequately attenuating alias products that have been found perceptually harmful.

6 Claims, 13 Drawing Sheets

Related U.S. Application Data application No. PCT/GB2014/051789 on Jun. 10, 2014, now Pat. No. 10,115,410.

(56) References Cited

U.S. PATENT DOCUMENTS

| | | | | |
|---|---|---|---|---|
| 5,757,931 | A | 5/1998 | Yamada et al. | |
| 5,808,574 | A | 9/1998 | Johnson et al. | |
| 5,928,313 | A | 7/1999 | Thompson | |
| 6,226,616 | B1 * | 5/2001 | You | G11B 20/10527 704/502 |
| 6,337,645 | B1 | 1/2002 | Pflaumer | |
| 6,750,793 | B2 | 6/2004 | Takeda | |
| 9,496,850 | B2 | 11/2016 | Jot et al. | |
| 9,793,879 | B2 | 10/2017 | Zhao | |
| 2001/0005173 | A1 * | 6/2001 | Snyder | G10L 19/26 341/123 |
| 2004/0120361 | A1 | 6/2004 | Yu et al. | |
| 2007/0118367 | A1 * | 5/2007 | Dickson | H03H 17/0211 704/E19.018 |
| 2008/0033730 | A1 * | 2/2008 | Jot | H03H 17/0266 704/E21.001 |
| 2008/0071528 | A1 | 3/2008 | Ubale et al. | |
| 2008/0109505 | A1 | 5/2008 | Prantl | |
| 2009/0017784 | A1 * | 1/2009 | Dickson | G10L 21/0364 455/296 |
| 2009/0027117 | A1 | 1/2009 | Andersen | |
| 2009/0319283 | A1 | 12/2009 | Schnell et al. | |
| 2010/0121897 | A1 * | 5/2010 | Bal | H03H 17/0671 708/313 |
| 2013/0211827 | A1 | 8/2013 | Savell | |
| 2016/0037252 | A1 | 2/2016 | Barratt | |
| 2016/0232907 | A1 | 8/2016 | Kovesi et al. | |
| 2016/0343384 | A1 | 11/2016 | Ragot et al. | |

OTHER PUBLICATIONS

Leonard, Brett. "The downsampling dilemma: perceptual issues in sample rate reduction." Audio Engineering Society Convention 124. Audio Engineering Society, 2008. (Year: 2008).*

Hogenauer, E.B. "An Economic Class of Digital Filters for Decimation and Interpolation", IEEE Transactions on Acoustics, Speech and Signal Processing, IEEE Inc, New York, vol. 29, No. 2, Apr. 1, 1981, 8 pp. As cited in an IDS dated Dec. 9, 2016 and filed in U.S. Appl. No. 15/317,794.

Story, Mike "A Suggested Explanation for (Some of) the Audible Differences Between High Sample Rate and Conventional Sample Rate and Conventional Sample Rate Audio Material", Sep. 1, 1997, 5 pp. As cited in an IDS dated Dec. 9, 2016 and filed in U.S. Appl. No. 15/317,794.

Altera Corporation Understanding CIC Compensation Filters, Apr. 1, 2007, retrieved on Oct. 22, 2014, 17 pp. As cited in an IDS dated Dec. 9, 2016 and filed in U.S. Appl. No. 15/317,794.

Phanendrababu, H Arvindchoubey, "Design of Multirate Linear Phase Decimation Filters for Oversampling Adcs", International Journal of Scientific & Technology Research, Jan. 1, 2013, 5 pp. As cited in an IDS dated Dec. 9, 2016 and filed in U.S. Appl. No. 15/317,794.

PCT International Search Report for International Application No. PCT/GB2014/050040 mailed Apr. 17, 2014, 10 pp. As cited in an IDS dated Dec. 9, 2016 and filed in U.S. Appl. No. 15/317,794.

PCT International Written Opinion for International Application No. PCT/GB2014/051789 mailed Nov. 3, 2014, 22 pp. As cited in an IDS dated Dec. 9, 2016 and filed in U.S. Appl. No. 15/317,794.

892 Form dated Jul. 2, 2018 which was received in connection with U.S. Appl. No. 15/317,794.

Lagadec, Roger, and T. G. Stockham. "Dispersive Models for A-to-D and D-to-A Conversion Systems." Audio Engineering Society Convention 75. Audio Engineering Society, 1984. (Year: 1984).

Woszczyk, Wieslaw. "Physical and perceptual considerations for high-resolution audio." Audio Engineering Society Convention 115. Audio Engineering Society, 2003. (Year: 2003).

Craven, Peter G. "Antialias filters and system transient response at high sample rates." Journal of the Audio Engineering Society 52.3 (2004): 216-242. (Year: 2004).

Laakso, Timo I., and V. Valimaki. "Energy-based effective length of the impulse response of a recursive filter." IEEE Transactions on Instrumentation and Measurement 48.1 (1999): 7-17. (Year: 1999).

Wackersreuther, Gunter. "Some new aspects of filters for filter banks." IEEE transactions on acoustics, speech, and signal processing 34.5 (1986): 1182-1200. (Year: 1986).

Schuller, Gerald. "A Low-Delay Filter Bank for Audio Coding with Reduced Pre-Echoes." Audio Engineering Society Convention 99. Audio Engineering Society, 1995. (Year: 1995).

Keith Howard, "Ringing False: Digital Audio's Ubiquitous Filter", https://www.stereophile.com, 2006, retrieved from the Internet Archive at: https ://web .archive .org/web/20110211173811 /https ://www .stereo phi le .com/features/106ri nging/index. html. (Year: 2011.

892 Form dated Jul. 2, 2018 which was received in connection with U.S. Appl. No. 16/149,651.

892 Form dated Oct. 3, 2022 which was received in connection with U.S. Appl. No. 16/149,651.

* cited by examiner

DIGITAL ENCAPSULATION OF AUDIO SIGNALS

CROSS-REFERENCE TO RELATED APPLICATIONS

This application is a divisional of U.S. application Ser. No. 17/120,889 filed on Dec. 14, 2020, which is a continuation of U.S. application Ser. No. 16/149,651 filed Oct. 2, 2018 which issued on Dec. 15, 2020 and was assigned U.S. Pat. No. 10,867,614 and which is a divisional of U.S. application Ser. No. 15/317,794 filed Dec. 9, 2016 which issued on Oct. 30, 2018 and was assigned U.S. patent Ser. No. 10/115,410 and which is a U.S. National Stage filing under 35 U.S.C. 371 and 35 U.S.C. 119, based on and claiming benefit of and priority to PCT/GB2014/051789 for "DIGITAL ENCAPSULATION OF AUDIO SIGNALS" filed Jun. 10, 2014.

FIELD OF THE INVENTION

The invention relates to the provision of high quality digital representations of audio signals.

BACKGROUND TO THE INVENTION

In the thirty years since the introduction of the Compact Disc (CD), the general public has come to accept "CD-quality" as the norm for digital audio. Meanwhile, two types of argument have raged in audio circles. One centres around the proposition that the 16 bits resolution and 44.1 kHz sampling rate of the CD are wasteful of data and that the equivalent sound can be conveyed by a more compact lossy-compressed format such as MP3 or AAC. The other takes the diametrically opposing view, asserting that the resolution and sampling rate of the CD are inadequate and that audibly better results are obtained using, for example, 24 bits and a sampling rate of 96 kHz, a specification commonly abbreviated to 96/24.

If 44 kHz is indeed not considered good enough, the question arises as to whether 96 kHz is the answer or whether 192 kHz or even 384 kHz should be the sampling rate for 'ultimate' quality. Many audiophiles assert that 96 kHz does sound better than 44.1 kHz and 192 kHz does indeed sound better than 96 kHz.

Historically, the transition from a continuous-time representation of an analogue waveform to a sampled digital representation has been justified by the sampling theorem (wvvw.en.wikipedia.org/wiki/Sampling theorem), which states that a continuous-time waveform containing only frequencies up to a maximum $f_{max}$ can be reconstructed exactly from a sampled representation having $2\times f_{max}$ samples per second. The frequency corresponding to half the sample rate is known as the Nyquist frequency, for example 48 kHz when sampling at 96 KHz.

Therefore, the continuous-time waveform is first filtered by a bandlimiting 'anti-alias' filter in order to remove frequencies above $f_{max}$ that would otherwise be 'aliased' by the sampling process and be reproduced as images below $f_{max}$. Following standard communications practice, the bandlimiting anti-alias filter usually approximates a flat frequency response up to $f_{max}$, so the frequency response graph has the appearance of a 'brickwall'. The same applies to a reconstruction filter used to regenerate a continuous waveform from the sampled representation.

According to this methodology, the process of sampling and subsequent reconstruction is exactly equivalent to a time-invariant linear filtering process that removes frequencies above $f_{max}$ and makes little or no change to frequencies significantly lower than $f_{max}$. It is therefore hard to understand that sampling at 192 kHz can sound better than sampling at 96 kHz, since the only difference would be the presence or absence of frequencies above about 40 kHz, which exceeds the conventional human hearing range of 20 Hz to 20 kHz by a factor two.

Two papers which attempt to partially explain this paradox are Dunn J "Anti-alias and anti-image filtering: The benefits of 96 kHz sampling rate formats for those who cannot hear above 20 kHz" preprint 4734 104th AES convention 1998 and Story M "A Suggested Explanation For (Some Of) The Audible Differences Between High Sample Rate And Conventional Sample Rate Audio Material" available from http://vvww.cirlinca.com/include/aes97ny.pdf.

Both suggest the reconciliation lies in looking at the filter's time domain response. Dunn finds that passband ripple has an effect like a pre- and post-echo, whilst Story looks at how the filter disperses the energy of an impulse in time. Although they point to different attributes, for both authors the issues reduce as sample rate increases. This is especially the case if a flat response is only maintained to 20 kHz instead of to near the Nyquist frequency, thus increasing the transition band before full alias rejection is required at the Nyquist frequency.

Story's approach is taken further in Craven, P. G., "Antialias Filters and System Transient Response at High Sample Rates". Here Craven teaches that even if the decimation and interpolation systems in a 96 kHz system have a "brickwall" response giving the sonic disadvantages of wide dispersion of impulse energy, an "apodising" filter operating at the 96 kHz rate can widen the effective transition band, narrowing the dispersion of impulse energy. FIG. 1 shows the frequency response (solid line) of an illustrative brickwall filter downsampling to 96 kHz, and also the response (dashed line) of an apodising filter. The corresponding impulse responses of the filters are then shown in FIGS. 2A and 2B, illustrating how the highly dispersive time response of the brickwall filter in FIG. 2A is shortened by application of the apodising filter to the compact time response in FIG. 2B.

However, even with apodising, it is still the case today that sampling at higher rates than 96 kHz can give audible improvements described in the same terms as Story reports: "less cluttered", "more air", "better hf detail" and in particular "better spatial resolution". A corollary is that the current state of the art loses something of these sonic attributes when using a moderate sample rate such as 96 kHz, despite useful progress in identifying what may be causing this loss.

Consequently, highest quality reproduction requires the use of extremely high sample rates with consequent impact on file sizes and bandwidth requirements. So, the prospects for interesting the public at large in high resolution sound appear bleak, with either onerous demands from the format or a realisation that quality has been lost. Accordingly, there is a need for an alternative methodology for distributing high quality audio at moderate sample rates which preserves the perceptual benefits associated with higher sample rates.

SUMMARY OF THE INVENTION

According to a first aspect of the present invention, there is provided a system comprising an encoder and a decoder for conveying the sound of an audio capture, wherein the encoder is adapted to furnish a digital audio signal at a transmission sample rate from a signal representing the audio capture, and the decoder is adapted to receive the digital audio signal and furnish a reconstructed signal, wherein the encoder comprises a downsampler adapted to receive the signal representing the audio capture at a first sample rate which is a multiple of the transmission sample rate and to downsample the signal to furnish the digital audio signal; and, wherein an impulse response of the encoder and decoder in combination is characterised by a duration for its cumulative absolute response to rise from 1% to 95% of its final value not exceeding five sample periods at the transmission sample rate.

In an alternative characterisation of this first aspect of the invention, the impulse response of the encoder and decoder in combination has a duration for its cumulative absolute response to rise from 1% to 50% of its final value not exceeding two sample periods at the transmission sample rate The resulting system allows for reduced sample rate transmission of audio without impairing sound quality, despite a relaxation on anti-aliasing rejection associated with the specified combined impulse response of the system. Moreover, the individual responses of the encoder and decoder can conform to various suitable designs provided that the composite impulse response satisfies the specified criterion for a compact system response. In this way, the invention solves the problem of how to reduce the sample rate for distribution of an audio capture whilst preserving the audible benefits that are associated with high sample rates, and does so in a manner that runs counter to conventional thinking.

Several observations have lead the inventors to this solution, which in part is based on observed characteristics of the human ear, rather than solely on conventional communications theory whose application implicitly assumes the ear (including the neural processing) is linear and time invariant. This includes the observation that the human ear is sensitive to frequencies <20 kHz, but also to impulses with higher time precision than a 20 kHz bandwidth would imply.

Downsampling requirements for good filter performance on band-limited material are generally in conflict with the requirements for good performance on impulsive sounds. The classically-ideal brick wall filter spreads the energy of an impulse over a very wide timespan, making it difficult to determine exact properties, such as inter-aural time difference and spatial properties.

However, the inventors have noted that the beneficial sonic properties observed by operating at sample rates of 192 kHz and higher are due, at least in part, to the more compact impulse response of the downsampling and upsampling filters in the higher frequency signal chain. They have further recognised that these sonic properties may be preserved whilst using a lower sample rate such as 96 kHz or lower by using similarly compact impulse responses for the downsampling and upsampling to and from the lower sample rate.

Indeed, the inventors have recognised that these sonic properties may even be improved, despite the lower sampling rate, by using a more compact impulse response than existing equipment uses at the higher sampling rate.

The inventors have further recognised that real world audio has a rising noise spectrum and falling signal spectrum, and so far less alias rejection is required than conventional wisdom mandates, especially if the alias requirements are determined by analysis of the actual audio to be resampled.

Although, such very compact impulse responses exhibit less alias rejection than the audio industry believes to be required for high quality audio, the inventors have recognised that the sonic benefits of a compact impulse response far outweigh any mild disbenefits from reduced alias rejection to the required level.

Finally, the inventors have recognised that a signal chain incorporating both decimation and interpolation can be improved by designing both filters as a pair rather than individually.

In developing the invention, the inventors have found it important that the filters are compact, without excessive post-ringing and especially not excessive pre-ringing. Whilst this makes sense as an intuitive concept, it is helpful to establish a measure of audibly significant duration so that filter durations can be compared. Ideally, this measure should correspond to the audible consequences of an extended response, but it may not be clear how to derive such a measure from existing experimental data on impulse detection.

A filter's support is a natural measure of its duration, but is unsatisfactory for current purposes, as can be seen by considering a mild IIR filter such as $(1-0.01\ z^{-1})^{-1}$. This filter scarcely disperses an impulse at all, yet has infinite support. Rather a measure is needed that looks at how extended in time the bulk of the impulse response is.

Therefore, a measure is proposed that integrates the absolute magnitude of the impulse response of the system with respect to time to form a cumulative response. This integration is to penalise significant extended ringing even at a low level. The elapsed time is measured for the cumulative response to rise from a low first threshold (such as 1%) to a high second threshold (such as 95%), wherein the thresholds are expressed as a percentage of the final value of the cumulative response, as illustrated in FIG. 14. However, it is noted that other thresholds may be used when characterising cumulative response, in which case a different duration in terms of sample periods may be specified to reflect the different measure.

Where the input to the system is sampled, the impulse response is not continuous. However, we do not want the determination of when the cumulant crosses the threshold values to be quantised to input sample periods, so the absolute impulse response values are held constant for the duration of the sample periods. This is equivalent to linearly interpolating the cumulant between sampling instants.

FIG. 14 illustrates the operation of this measure on a filter according to the invention, which will be described later with reference to FIG. 5B. Other filters according to the invention described later likewise conform to this measure. The input sampling rate is twice the transmission rate, and so the impulse response is held for half transmission sample periods. The cumulant, integrating the absolute value of the impulse response, runs from 0% of its final value at t=0 to 100% at t=4.5 (since the filter is a 9 tap FIR). The 95% level intersects the cumulant graph at t=2.69 transmission rate samples. Likewise the 1% level intersects the graph at t=0.03 samples, but this is not shown in the figure as it would not be visible on this scale in the bottom left corner. Consequently, by this measure, this filter has a duration of 2.69−0.03=2.66 transmission rate samples, thereby satisfying the requirements of the invention.

Listening tests have indicated that shorter impulse responses are almost always better, and in most cases it has proved possible to design a filter that does not have a significant response duration by this definition extending beyond 5 transmission rate sample periods. However, all other things being equal, shorter would be better, and it is preferable for the duration to be below 4 transmission rate samples and more preferably below 3.

This definition of temporal duration provides a meaningful measure of the composite impulse response for comparing against specific filter designs for a system that satisfies the criteria. In addition, the same definition for temporal duration of impulse response can be applied to the response of components within the system, such as encoder or decoder or individual filters, thereby allowing a direct comparison and determination as to whether one is more compact than another.

It is considered important that the thresholds in the above definition of the temporal duration are asymmetric to reflect the greater audibility of filter pre-responses to post-responses. Further investigation may point to other particular threshold levels better matched to the audible impact, with a corresponding modification to the duration in terms of sample length.

For example it may be sensible to concentrate measurement on the cumulant initially rising swiftly. This could be done with the first threshold still at 1%, but the second threshold at 50%. In FIG. 14, the 50% level intersects the cumulant graph at t=0.99, so this filter's duration is 0.99-0.03=0.96 according to this alternative measure. Clearly durations are shorter with this alternative measure so in this case the duration of the system impulse response is preferably below 2 transmission rate samples and more preferably below 1.5 transmission rate samples When considering a time-invariant linear filter or system, the impulse response is a well-understood property. For a system that includes decimation however, the response to an impulse may be different according to when the impulse is presented relative to the sample points of the decimated processing. Therefore, when referring to the impulse response of such a system, we mean the response averaged over all such presentation instants of the original impulse.

Preferably, the downsampler comprises a decimation filter specified at the first sample rate, wherein the alias rejection of the decimation filter is at least 32 dB at frequencies that would alias to the range 0-7 kHz on decimation.

The range 0-7 kHz is the range where the ear is most sensitive. The amount of attenuation required varies greatly according to the spectrum of the signal to be encoded in the vicinity of its Nyquist frequency, and may signals will require more than 32 dB of attenuation.

It is further preferred that that there should exist a second filter having the same alias rejection as the decimation filter, and a response having a duration for its cumulative absolute response to rise from 1% to 95% of its final value not exceeding five sample periods at the transmission sample rate. Preferably the duration does not exceed 4 sample periods, and more preferably does not exceed 3 sample periods.

This is because it can be preferable to design a second filter with the desired sonic performance, but use for decimation a different filter with the same alias rejection but additionally incorporating passband flattening for the benefit of a listener using legacy equipment. Thus, the actual decimation filter might have a longer duration but a matched decoder would undo the passband flattening thus allowing access to the sonic qualities of the originally designed second filter.

Under the alternative measure of filter length the second filter is characterised by a response having a duration for its cumulative absolute response to rise from 1% to 50% of its final value not exceeding two sample periods at the transmission sample rate. Preferably the duration does not exceed 1.5 sample periods In some embodiments the encoder comprises an Infinite Impulse Response (IIR) filter having a pole, and the decoder comprises a filter having a zero whose z-plane position coincides with that of the pole, the effect of which is thereby cancelled in the reconstructed signal.

In other embodiments the decoder comprises an Infinite Impulse Response (IIR) filter having a pole, and the encoder comprises a filter having a zero whose z-plane position coincides with that of the pole, the effect of which is thereby cancelled in the reconstructed signal.

Preferably, the decoder comprises a filter having a response which rises in a region surrounding the Nyquist frequency corresponding to the transmission sample rate and the encoder comprises a filter having a response that falls in said region, thereby reducing downward aliasing in the encoder of frequencies above the Nyquist frequency to frequencies below the Nyquist frequency without compromising the total system frequency response or impulse response. This feature is particularly helpful in cases where the original signal has a steeply rising noise spectrum.

In preferred embodiments the transmission sample rate is selected from one of 88.2 kHz and 96 kHz and the first sample rate is selected from one of 176.4 kHz, 192 kHz, 352.8 kHz and 384 kHz, these being standardised sample rates at which the invention has been found to be audibly beneficial.

According to a second aspect of the present invention, there is provided a method of furnishing a digital audio signal for transmission at a transmission sample rate by reducing the sample rate required to convey the sound of captured audio, the method comprising the steps of:

- filtering a representation of the captured audio having a first sample rate that is a multiple of the transmission sample rate using a decimation filter specified at the first sample rate; and,
- decimating the filtered representation to furnish the digital audio signal, wherein an impulse response of the decimation filter has an alias rejection of at least 32 dB at frequencies that would alias to the range 0-7 kHz on decimation,
- wherein there exists a second filter having the same alias rejection as the decimation filter, and a response having a duration for its cumulative absolute response to rise from 1% to 95% of its final value not exceeding five sample periods at the transmission sample rate.

Once again, the second filter can be used to allow the actual decimation filter to have a lengthened duration due to incorporating passband flattening for the benefit of a listener using unmatched legacy equipment. Alternatively, if passband flattening for the legacy listener is not performed, the decimation filter will be the same as the second filter.

The invention thus provides adequate rejection of undesirable alias products, and of any ringing near the Nyquist frequency of the representation at the first sample rate, while not extending the system impulse response more than necessary.

In some embodiments the method further comprises the steps of analysing a spectrum of the captured audio, and choosing the decimation filter responsively to the analysed spectrum. The method may then further comprise the step of furnishing information relating to the choice of decimation filter for use by a decoder. In some embodiments the method further comprises the steps of analysing the noise floor of the captured audio and choosing the decimation filter responsively to the analysed noise floor. In that way both the decimation filter and a corresponding reconstruction filter in a decoder can be optimally matched to the noise spectrum or other characteristics of the signal to be conveyed.

In preferred embodiments the transmission sample rate is selected from one of 88.2 kHz and 96 kHz and the first sample rate is selected from one of 176.4 kHz, 192 kHz, 352.8 kHz and 384 kHz, these being standardised sample rates at which the invention has been found to be audibly beneficial.

Although the invention operates with contiguous time region having an extent not greater than 6 sample periods of the transmission sample rate, in some embodiments the extent of this contiguous time region is advantageously no greater than 5 period, 4 periods or even 3 periods of the transmission sample rate. It has been found on some signals that these shorter impulse responses are audibly even more beneficial than embodiments with an impulse response lasting 6 periods.

According to a third aspect of the present invention, a data carrier comprises a digital audio signal furnished by performing the method of the aspect aspect.

According to a fourth aspect of the present invention, an encoder for an audio stream is adapted to furnish a digital audio signal using the method of the second aspect.

In preferred embodiments the encoder comprises a flattening filter having a symmetrical response about the transmission Nyquist frequency. Preferably, the flattening filter has a pole.

According to a fifth aspect of the present invention, there is provided a system for conveying the sound of an audio capture, the system comprising:

- an encoder adapted to receive a signal representing the audio capture and to furnish a digital audio signal at a transmission sample rate, said encoder characterised by an impulse response having a duration for its cumulative absolute response to rise from 1% to 95% of its final value; and,
- a decoder adapted to receive the digital audio signal and furnish a reconstructed signal, said decoder characterised by an impulse response having a duration for its cumulative absolute response to rise from 1% to 95% of its final value,
- wherein the combined response of the encoder and decoder produce a total system impulse response having a duration for its cumulative absolute response to rise from 1% to 95% that is less than the characterising duration of the impulse response of the encoder alone and the characterising duration of the impulse response of the decoder alone.

This aspect may be useful when special characteristics of the material being encoded require extra poles or zeros in the encoder frequency response to address spectral regions with high levels of noise in the captured audio. Corresponding zeros or poles in the decoder response cause the special measures to have no effect on the passband of the complete system, and also lead the complete system impulse response to be unchanged by the special measures. The individual encoder and decoder responses are however lengthened by the measures and may both be longer than the combined system response.

Preferably, the decoder comprises a filter having a z-plane zero whose position coincides with that of a pole in the response of the encoder.

Preferably, the decoder comprises a filter chosen in dependence on information received from the encoder.

In some embodiments it is preferred that an impulse response of the encoder and decoder in combination has a largest peak, and is characterised by a contiguous time region having an extent not greater than 6 sample periods of the transmission sample rate outside of which the absolute value of the averaged impulse response does not exceed 10% of said largest peak.

According to a sixth aspect of the present invention, there is provided an encoder adapted to furnish a digital audio signal at a transmission sample rate from a signal representing an audio capture, the encoder comprising a downsampling filter having an asymmetric component of response equal to the asymmetric component of response of a filter whose frequency response has a double zero at each frequency that will alias to zero frequency and has a slope at the transmission Nyquist frequency more positive than minus thirteen decibels per octave.

It is preferred that the encoder comprises a flattening filter having a symmetrical response about the transmission Nyquist frequency. Preferably, the flattening filter has a pole. It is further preferred that the transmission frequency is 44.1 kHz and the encoder's frequency response droop does not exceed 1 dB at 20 kHz.

According to a seventh aspect of the present invention, there is provided a system comprising an encoder and a decoder for conveying the sound of an audio capture, wherein the encoder is adapted to furnish a digital audio signal at a transmission sample rate from a signal representing the audio capture, and the decoder is adapted to receive the digital audio signal and furnish a reconstructed signal,

- wherein the encoder comprises a downsampler adapted to receive the signal representing the audio capture at a first sample rate which a multiple of the transmission sample rate and to downsample the signal to furnish the digital audio signal; and,
- wherein the encoder comprises an Infinite Impulse Response (IIR) filter having a pole, and the decoder comprises a filter having a zero whose z-plane position coincides with that of the pole, the effect of which is thereby cancelled in the reconstructed signal.

Preferably, an impulse response of the encoder and decoder in combination has a largest peak, and is characterised by a contiguous time region having an extent not greater than 6 sample periods of the transmission sample rate outside of which the absolute value of the averaged impulse response does not exceed 10% of said largest peak.

According to an eighth aspect of the present invention, there is provided an encoder adapted to furnish a digital audio signal at a transmission sample rate from a signal representing an audio capture, the encoder comprising a downsampling filter adapted to receive the signal representing the audio capture at a first sample rate which a multiple of the transmission sample rate and to downsample the signal to furnish the digital audio signal, wherein the encoder is adapted to analyse a spectrum of the captured audio and select the downsampling filter responsively to the analysed spectrum.

Preferably, the selected downsampling filter has a steeper attenuation response at the transmission Nyquist frequency if the analysed spectrum is rising rapidly at the transmission Nyquist frequency.

It is preferred that the encoder is adapted to transmit information identifying the selected downsampling filter to a decoder as metadata.

In preferred embodiments the encoder comprises a flattening filter having a symmetrical response about the transmission Nyquist frequency. Preferably, the flattening filter has a pole.

According to an ninth aspect of the present invention, there is provided a decoder for receiving a digital audio signal at a transmission sample rate and furnishing an output audio signal, wherein the decoder comprises a filter having an amplitude response which increases with frequency in a frequency region surrounding the Nyquist frequency corresponding to the transmission sample rate.

This feature is necessary in order to optimise a signal-to-alias ratio for frequencies near the Nyquist frequency in cases where the representation at the higher sample rate shows a strongly rising spectrum at the said Nyquist frequency and where it is desired to minimise phase distortion over the conventional audio band 0-20 kHz.

Preferably, the filter has an amplitude response of at least +2 dB at the Nyquist frequency corresponding to the transmission sample rate, relative to the response at DC. In general, a rising decoder response can be advantageous in allowing an encoder to provide adequate alias attenuation while providing a flat frequency response in the audio range and not lengthening the total system impulse response, and while the decoder response should eventually fall, it is generally still somewhat elevated at the said Nyquist frequency.

In some embodiments it is preferred that the filter has a response chosen in dependence on information received from an encoder. This allows the encoder to choose the filtering optimally on a case-by-case basis.

As will be appreciated by those skilled in the art, various methods are disclosed for optimising the sound of the reconstructed signal and in particular for controlling decimation aliases without lengthening the total impulse response of the system in an undesirable manner.

Advantageously, filters are selected responsively to the characteristics of the source material. Likewise, different filter implementations such as all-zero, all-pole and polyphase may be employed as appropriate for each situation. Further variations and embellishments will become apparent to the skilled person in light of this disclosure.

BRIEF DESCRIPTION OF THE DRAWINGS

Examples of the present invention will be described in detail with reference to the accompanying drawings, in which.

DETAILED DESCRIPTION

Figure 1:
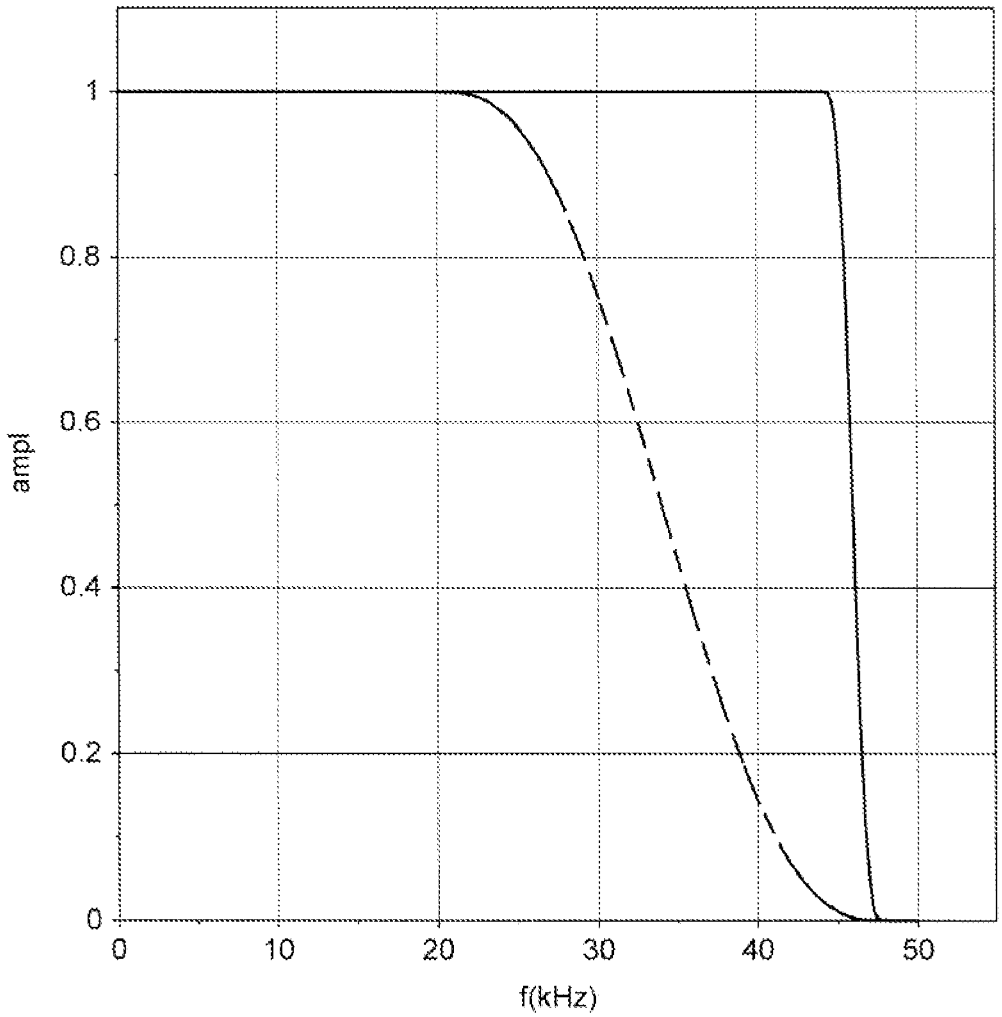
FIG. 1 (Prior art)
FIG. 1 shows a known (continuous) 'brickwall' antialias filter response for use with 96 kHz sampling, and (dotted) an apodised filter response.
Figure 2A:
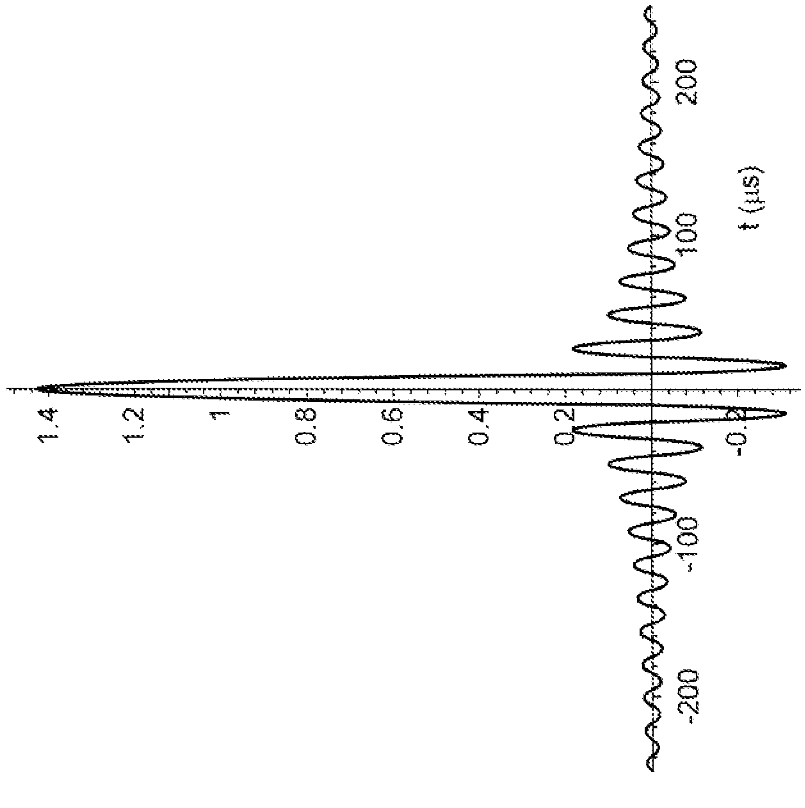
FIG. 2A (Prior art)
FIGS. 2A and 2B show known impulse responses corresponding to linear phase filters having the frequency responses shown in FIG. 1.
Figure 2B:
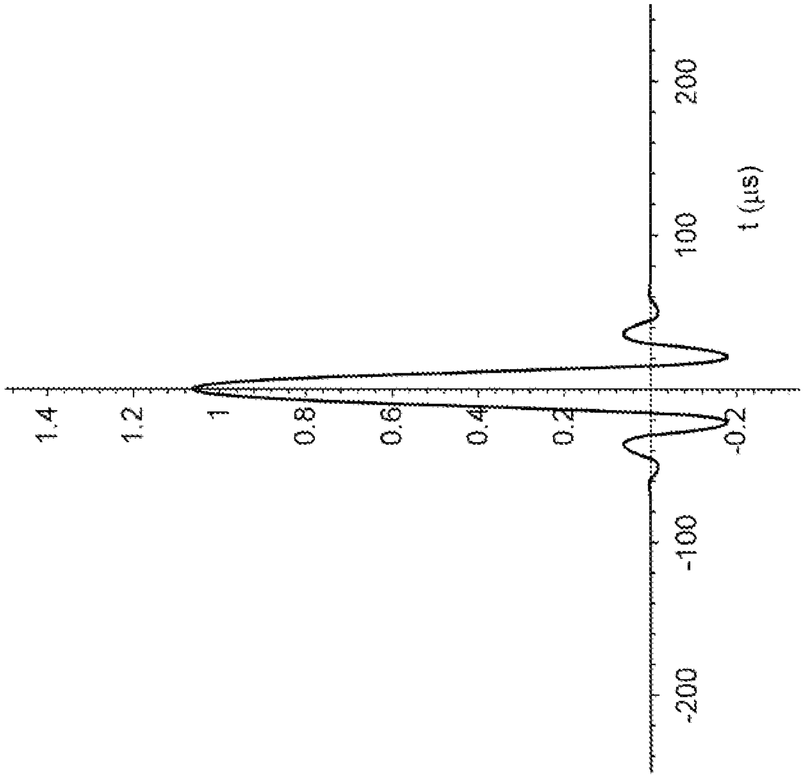
FIG. 2B (Prior art)

The present invention may be implemented in a number of different ways according to the system being used. The following describes some example implementations with reference to the figures.

Axioms

Most adult listeners are unable to hear isolated sinewaves above 20 kHz and it has hitherto often been assumed that this implies that frequency components of a signal above 20 kHz are also unimportant. Recent experience indicates that this assumption, though plausible by analogy with linear-system theory, is incorrect.

Current understanding of human hearing is very incomplete. In order to make progress we have therefore relied on hypotheses that have been only partially or indirectly verified. The invention will thus be explained on the basis of the following hypotheses:

The ear does not behave as a linear system

As well as analysing tones in the frequency domain, the ear also analyses transients in the time domain. This may be the dominant mechanism in the ultrasonic region.

"Ringing" of filters used for antialiasing and reconstruction is undesirable, even if in the high ultrasonic range 40 kHz-100 kHz.

Aliasing of frequencies above 48 kHz to frequencies below 48 kHz is not catastrophic to sound quality, provided the aliased products do not fall within the conventionally audible range 0-20 kHz.

A pre-ring is usually more of a problem than a post-ring, but both are bad.

It seems best if the temporal extent of the total system impulse response can be minimised.

Regarding the last of these points, the "total system" is intended to include the analogue-to-digital and digital-to-analogue converters, as well as the entire digital chain in between. Ideally, one might include the transducer responses too, but these are considered outside the scope of this document.

Sampling and Aliasing

A continuous time signal can be viewed as a limiting case of a sampled signal as the sample rate tends to infinity. At this point we are not concerned whether an original signal is analogue, and therefore presumably continuous in time, or whether it is digital, and therefore already sampled. When we talk about resampling, we mean sampling a notional continuous-time signal that is represented by the original samples.

A frequency-domain description of sampling or resampling is that the original frequency components are present in the resampled signal, but are accompanied by multiple images analogous to the 'sidebands' that are created in amplitude modulation. Thus, an original 45 kHz tone creates an image at 51 kHz, if resampled at 96 kHz, the 51 kHz being the lower sideband of modulation by 96 kHz. It may be more intuitive to think of all frequencies as being 'mirrored' around the Nyquist frequency of 48 kHz; thus 51 kHz is the mirror image of 45 kHz, and equally an original 51 kHz tone will be mirrored down to 45 kHz in the resampled signal.

If a transmission channel involves several resamplings at different rates, images of the original spectrum will accumulate and there is every possibility that an audio tone will be mirrored upward by one resampling and then down by a subsequent resampling, landing within the audible range but at a different frequency from the original. It is to prevent this that 'correct' communications practice teaches that antialias and reconstruction filters should be used at each stage so that all images are suppressed. If this is done, resamplings may be cascaded arbitrarily without build-up of artefacts, the limitation being merely that the frequency range is limited to that which can be handled by the lowest sample rate in the chain.

However, we take the view that filters that would be considered correct in communications engineering are not audibly satisfactory, at least not at sample rates that are currently practical for mass distribution. We accept that aliasing may take place and are proposing to balance aliasing against 'time-smear' of transients due to the lengthening of the system's impulse response caused by filtering.

Thus, unlike in traditional practice, aliasing is not completely removed and will build up on each resampling of the signal. Hence, multiple resamplings to arbitrary rates are not undertaken without penalty and it is best if the signal is always represented at a sample rate that is an integer multiple of the rate that will be used for distribution. For example, analogue-to-digital conversion at 192 kHz followed by distribution at 96 kHz is fine, and conversion at 384 kHz may be better still, depending on the wideband noise characteristics of the converter.

Following distribution, the consumer's playback equipment also needs to be designed so as not to introduce long filter responses, and indeed the encoding and decoding specifications should preferably be designed together to give certainty of the total system response.

Downsampling from 192 kHz for 96 kHz Distribution

We consider the problem of taking a signal that has already been digitised at 192 kHz, downsampling the signal to 96 kHz for transmission and then upsampling back to 192 kHz on reception. It is understood that the principles described here apply to storage as well as transmission, and the word 'transmission' encompasses both storage and transmission.

Figure 3:
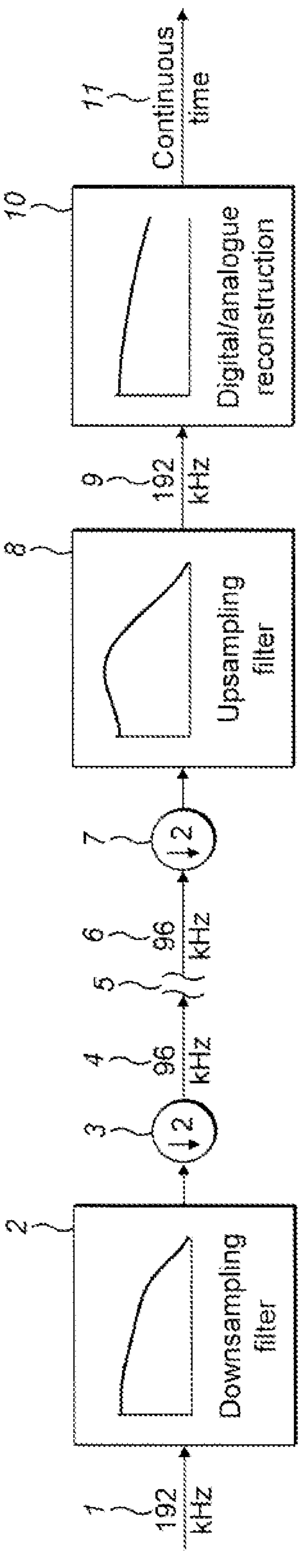
FIG. 3 shows a system for transmitting an audio signal at a reduced sample rate, with subsequent reconstruction to continuous time.

Referring to the system shown in FIG. 3, the input signal 1 at a sampling rate such as 192 kHz is passed to a downsampling filter 2 and thence to a decimator 3 to produce a signal 4 at a lower sampling rate such as 96 kHz. After passing through the transmission or storage device 5, the 96 kHz signal 6 is upsampled 7 and filtered 8 to furnish the partially reconstructed signal 9, at a sampling rate such as 192 kHz.

The main focus of this document is the method of producing the partially reconstructed signal 9, but we also note that further reconstruction 10 is needed to furnish a continuous-time analogue signal 11. The object of the invention is to make the sound of signal 11 as close as possible to the sound of an analogue signal that was digitised to furnish the input signal 1. This does not necessarily imply that signal 9 should be as close as possible in an engineering sense to signal 1. Moreover, the further reconstruction 10 may have a frequency response droop which can, if desired, be allowed for in the design of the filters 2 and 8.

FIG. 3 shows the filter 2 and downsampler 3 as separate entities but it will sometimes be more efficient to combine them, for example in a polyphase implementation. Similarly the upsampler 7 and filter 8 may not exist as separately identifiable functional units.

Downsampling uses decimation, in this case discarding alternate samples from the 192 kHz signal, while upsampling uses padding, in this case inserting a zero sample between each consecutive pair of 96 kHz samples and also multiplying by 2 in order to maintain the same response to low frequencies. On downsampling, frequencies above the 'foldover' frequency of 48 kHz will be mirrored to corresponding images below the foldover frequency. On upsampling, frequencies below the foldover frequency will be mirrored to corresponding frequencies above the foldover frequency. Thus, upsampling and downsampling create upward aliased products and downward aliased products, which can be controlled by an upsampling filter prior to decimation and a downsampling filter following the padding. The upsampling and downsampling filters are specified at the original sampling frequency of 192 kHz.

If the aliased products are ignored, the total response is the combination of the responses of the upsampling and downsampling filters. In the time domain, this combination is a convolution.

We have found that good results are obtained by designing upsampling and downsampling filters such that the total response is that of a Finite Impulse Response (FIR) filter of minimal length. In the z-transform domain, zeroes can be introduced into each of these filters to suppress undesirable responses. In particular, it is likely that each filter will have one or more transfer function zeroes near $z=-1$ in order to suppress signals near the Nyquist frequency of 96 kHz. In downsampling without filtering, such signals would alias to audio frequencies, including frequencies below 10 kHz where the ear is most sensitive. Conversely, if upsampling is performed by padding without filtering, large low frequency signal content will create large image energy near 96 kHz which, whether or not of audible consequence, may place unacceptable demands on the slew-rate capabilities of subsequent electronics, and possibly also burn out loudspeaker tweeters.

FIR filters whose zeroes are all close to the Nyquist will not, by themselves, cause overshoot or ringing: the impulse response will be unipolar and reasonably compact. However a $(1+z^{-1})$ factor implemented at 192 kHz introduces a frequency response droop of 0.47 dB at 20 kHz. This would be considered only marginally acceptable in professional digital audio equipment, and if we need several such factors, say five or more, the passband droop and resulting dulling of the sound certainly becomes unacceptable. Accordingly, a correction or "flattening" filter is needed, as will be discussed shortly.

Upsampling from 96 kHz for Playback

It is usual for reconstruction to a continuous-time signal to be performed using a sequence of '2×' stages. I.e., the sampling rate is typically doubled at each stage and a conversion from digital to analogue is performed when the sampling rate has reached 384 kHz or higher. We shall concentrate firstly on the first and most critical stage: that of upsampling from 96 kHz to 192 kHz.

At the heart of this upsampling is an operation, conceptual or physical, of zero-padding the stream of 96 kHz samples to produce the 192 kHz stream. That is, we generate a 192 kHz signal whose samples are alternately a sample from the 96 kHz signal and zero.

Zero-padding creates upward aliased products having the same amplitude as the frequencies that were aliased. In the current context, these products are all above 48 kHz and one might assume that they will be inaudible. However the signal will generally have high amplitudes at low audio frequencies, which implies high-level alias products at frequencies near 96 kHz. As already noted, these alias products need to be controlled in order to not to impose excessive slew-rate demands on subsequent electronics and risk the burn-out of loudspeaker tweeters. The purpose of an upsampling or reconstruction filter is to provide this control, and it will be seen that strong attenuation near 96 kHz is the prime requirement.

Figure 4:
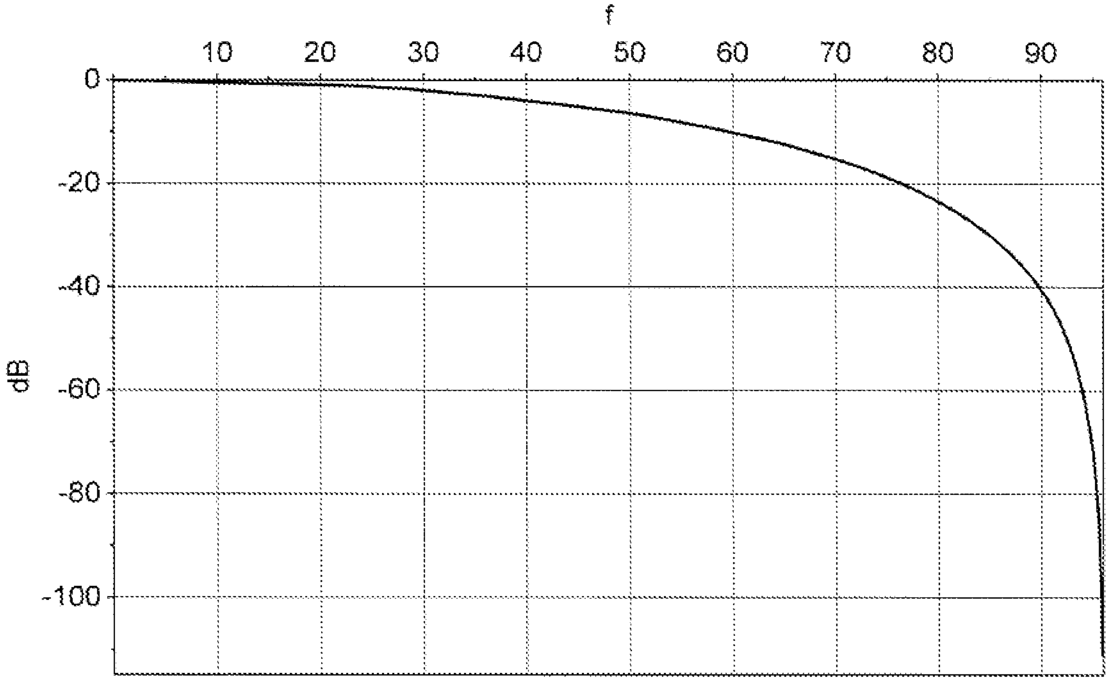
FIG. 4 shows the response of a (½, 1, ½) reconstruction filter, normalised for unity gain at DC.

The simplest reconstruction filter that we consider satisfactory for 96 kHz to 192 kHz reconstruction is a 3-tap FIR filter having taps (½, 1, ½) implemented at the 192 kHz rate. Its normalised response is shown in FIG. 4. This filter has two z-plane zeroes at z=−1, corresponding to the Nyquist frequency of 96 kHz. These zeroes provide attenuation near 96 kHz which may or may not be sufficient so further near-Nyquist zeroes may be required. The (½, 1, ½) filter also introduces a droop of 0.95 dB at 20 kHz, or 1.13 dB if operated at 176.4 kHz, which will need to be corrected.

Passband Flattening

Since the system includes a downsampler, correction to flatten a frequency response that droops towards the top of the conventional 0-20 kHz audio range could be provided either at the original sample rate or the downsampled rate, but to provide the shortest end-to-end impulse response on the upsampled output the flattening should be performed at the higher sample rate, such as 192 kHz. This still leaves choice about where the correction is performed:

a. The encoder (downsampler) and decoder (upsampler) each incorporates a correction for its own droop
b. The encoder provides correction for itself and for the decoder
c. The decoder provides correction for itself and for the encoder
d. Arbitrary distribution of correction between encoder and decoder.

Option (a) may be convenient in practice since the resulting downsampled stream will have a flat frequency response and can be played without a special decoder, However the resulting combined of "end-to-end" impulse response of encoder and decoder is then likely to be longer than when a single corrector corrector is designed for the total droop.

Options (b) and (c) may provide the same end-to-end impulse response, and so may option (d) if a single corrector to the total response is generated, factorised ad the factors distributed. However although the end-to-end responses may be the same, putting the flattening filter in the encoder prior to downsampling generally increases downward aliasing in the encoder, and listening tests have tended to favour putting the flattening filter in the decoder after upsampling, even though upward aliases are thereby intensified.

As for the design of the correction filter, the skilled person will be aware that in the case of a linear-phase droop, a linear-phase correction filter can be obtained by expanding the reciprocal of the z-transform of the droop as a power series in the neighbourhood of z=1. This total response can thereby be made maximally flat to any desired order by adjusting the order of the power-series expansion. In the present context however a minimum-phase correction filter is preferred in order to avoid pre-responses. To this end, the droop is first convolved with its own time reverse to produce a symmetrical filter and above procedure applied. This will result in a linear-phase corrector which provides twice the correction, in decibel terms, needed for the original droop. The linear-phase corrector is then factorised into quadratic and linear polynomials in z, half of the factors being minimum-phase and half being maximum-phase. The minimum-phase factors are selected and combined and normalised to unity DC gain to provide the final correction filter. This methodology was illustrated in section 3.6 of the above-mentioned 2004 paper by Craven, building on the work of Wilkinson (Wilkinson, R. H., "High-fidelity finite-impulse-response filters with optimal stopbands". IEE Proc-G Vol. 120, no. 2, pp. 264-272: 1991 April).

The effect of the correction filter is not only to flatten the passband but also to increase the near-Nyquist response of the encoder in case (b) or of the decoder in case (c), or potentially both in case (d), the increase probably requiring the introduction of further zeroes near z=−1 in order to achieve a desired near-Nyquist attenuation specification. The further zeroes will require an increase in the strength of the correction filer. Thus, the zeroes that attenuate near Nyquist and passband correction filter need to be adjusted together until a satisfactory result is obtained.

Total System Response

If fed with a zero-padded 96 kHz signal, the output of a 3-tap reconstruction filter having taps (½, 1, ½) implemented at the 192 kHz rate is a 192 kHz stream in which each even-numbered sample has the same value as its corresponding 96 kHz sample and each odd-numbered sample has a value equal to the average of its two neighbouring even-numbered samples. If now multistage reconstruction to continuous time similarly uses a 3-tap (½, 1, ½) reconstruction filter at each stage, the result will be equivalent to linear interpolation between consecutive 96 kHz samples.

In the frequency domain, the response of such a multi-stage reconstruction is the square of a sinc function:

$$\left(sinc\left(\frac{\pi f}{96\text{ kHz}}\right)\right)^2$$

where f is frequency and $$sinc(x)=\frac{\sin(x)}{x}.$$

The passband droop may be approximated by a quadratic in f:

$$1-\frac{\pi^2(f/96\text{ kHz})^2}{3}\approx 1-3.290f/96\text{ kHz}^2,$$

which implies a response of −1.34 dB at 20 kHz if reconstructing from 96 kHz, or −1.61 dB at 20 kHz if reconstructing from 88.2 kHz.

Reconstructed thus, the slew rate of the continuous-time signal is never greater than that implied by the 96 kHz samples on the basis of linear interpolation. Nevertheless, it will have small discontinuities of gradient. Viewed on a sufficiently small time scale, this is not possible electrically, let alone acoustically. It is outside our scope to consider the analogue processing in detail, but we note that an impulse response that is everywhere positive must, unless it is a Dirac delta function, have some frequency response droop. We prefer not to require the use of an analogue 'peaking' filter to produce a flat overall response since the shortest overall impulse response is likely to be obtained if all passband correction is applied at a single point. We therefore prefer that the digital passband flattening should have some allowance for analogue droop.

Nevertheless, the more droop that is corrected, the less compact is the upsampling filter. In the filters presented here we have therefore compensated for the sinc(·)$^2$ droop for assumed multistage reconstruction from a 192 kHz stream to continuous time, with a further margin to allow for a small droop, amounting to 0.162 dB at in subsequent analogue processing. This margin would allow for an analogue system having a strictly nonnegative impulse response of rectangular shape and extent 5 μs, or alternatively a Gaussian-like response with standard deviation approximately 3 μs.

Figure 5A:
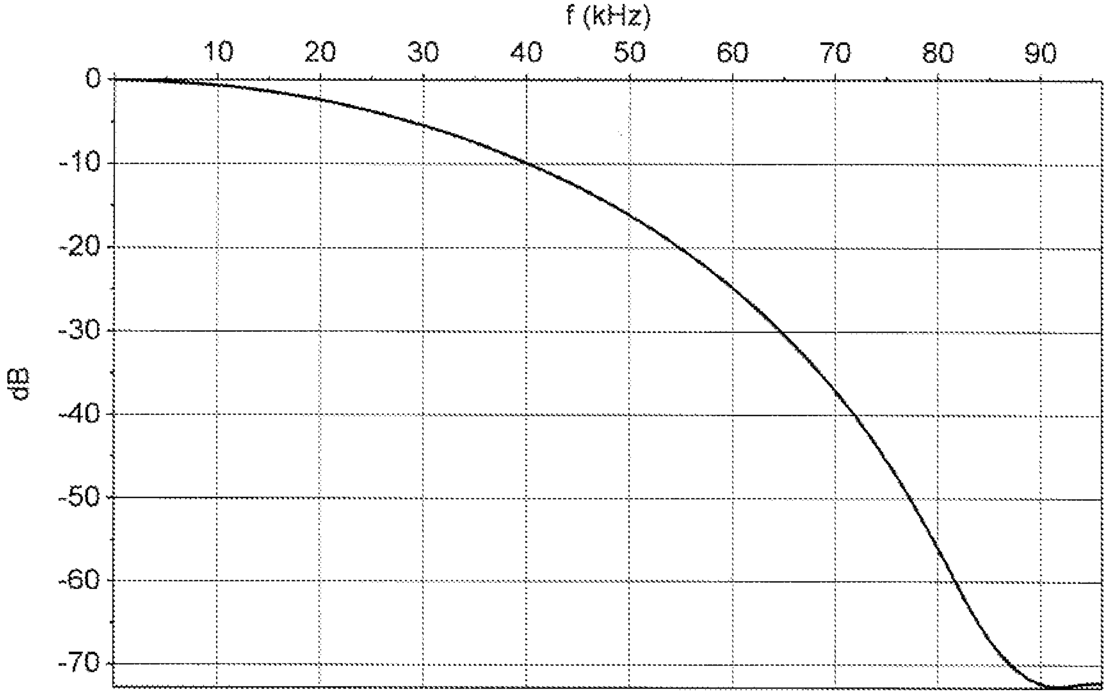
FIG. 5A shows the frequency response of an unflattened downsampling filter.

FIG. 5A shows the response of a 6-tap downsampling filter designed according to these principles having a near-Nyquist attenuation of 72 dB and z-transform response:

$$0.0633+0.2321z^{-1}+0.3434z^{-2}0.2544z^{-3}+0.0934z^{-4}0.0134z^{-5}$$

Figure 5B:
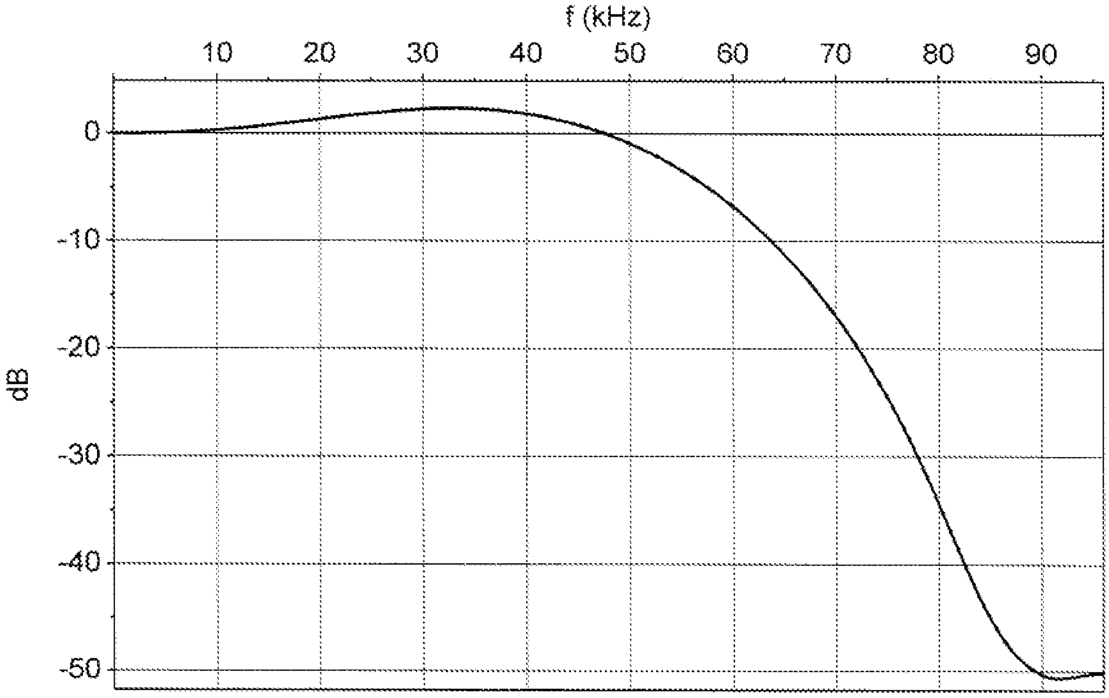
FIG. 5B shows the frequency response of a downsampling filter incorporating flattening.

If paired with the previously discussed 3-tap upsampling filter having response (½+z−1+½ z−2), we find that a 4-tap correction filter:

$$4.3132-5.3770z^{-1}+2.4788z^{-2}-0.4151z^{-3}$$

will correct the total droop from the downsampling filter and the 3-tap upsampling filter, to provide an end-to-end response flat within 0.1 dB at 20 kHz, including the effect of analogue droop as discussed above. If this correction filter is folded with the downsampling filter, the combined encoding filter has z-transform:

$$0.27289+\frac{0.66093}{z}+\frac{0.39002}{z^2}-\frac{0.20014}{z^3}-\frac{0.20992}{z^4}+\frac{0.04329}{z^5}+\frac{0.05411}{z^6}-\frac{0.00563}{z^7}-\frac{0.00555}{z^8}$$

and the response shown in FIG. 5B, which rises above 20 kHz in order to pre-correct the droop from the subsequent upsampling and reconstruction.

Figure 6:
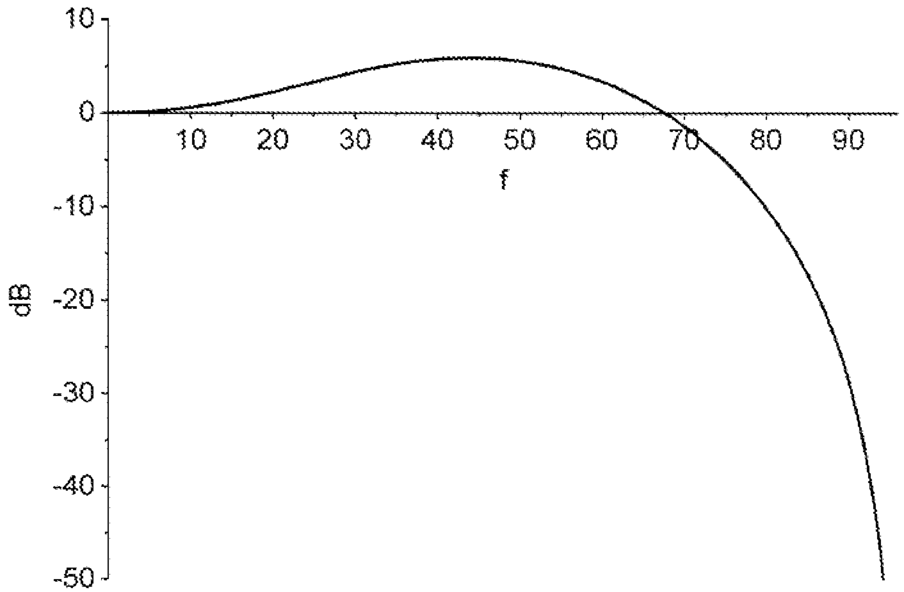
FIG. 6 shows the response of a reconstruction filter including upsampling to continuous time and a third-order correction for the passband droop of FIG. 5A.

Alternatively, the correction can be folded with the upsampling filter (½+z$^{-1}$+½ z$^{-2}$) whose response is shown in FIG. 4 to produce a decoding filter having the response shown in FIG. 6 and the z-transform:

$$2.1566-0.5319z^{-1}+0.7076z^{-2}-1.65666z^{-3}+1.0319z^{-4}-0.2076z^{-5}$$

In this case it is the decoder that has a rising response, to correct the droop from the 6-tap encoding filter having the response of FIG. 5A. Listening tests have indicated that this 9-tap downsampling filter has a distinct superiority relative to longer filters and we have deduced that shorter filters are preferable generally.

Figure 7:
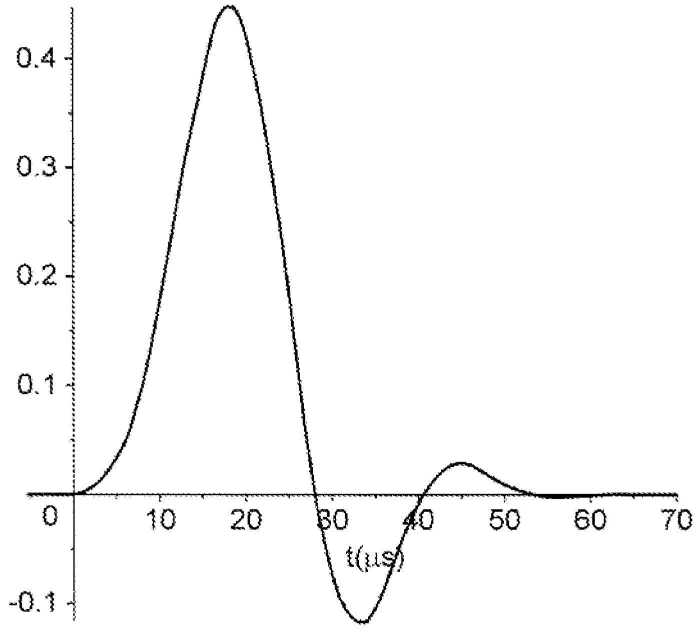
FIG. 7 shows the total system impulse response when the filters of FIG. 4 and FIG. 5B are combined with further upsampling to continuous time.

Of greater significance however is the total response when the downsampler, upsampler and assumed analogue response are combined. FIG. 7 shows the impulse response from the downsampler, a multi-stage upsampler as proposed above and an analogue system having a rectangular impulse response of width 5 μs. With no threshold applied, the total extent of the response is 13 samples or 67.7 μs, but with a threshold of −40 dB or 1% of the maximum, the absolute value of the response exceeds the threshold only in a region of extent 49.5 μs, i.e. 9.5 samples at the 192 kHz rate or 4.75 samples at the transmission sample rate of 96 kHz. Similarly, with a threshold of −20 dB or 10% of the maximum, the absolute value of the response exceeds the threshold only in a region of extent 32.2 μs, i.e. 6.2 samples at the 192 kHz rate or 3.1 samples at the transmission sample rate of 96 kHz. Thus, it is safe to say that the temporal extent of this filter does not exceed 4 sample periods of the transmission sample rate. When other criteria are tightened, the impulse response may need to be somewhat longer, but in nearly all reasonable cases it is possible to achieve an impulse response of length not exceeding 6 sample periods at the transmission sample rate.

An encoder and decoder combination incorporating the downsampling and upsampling filters described above and with the total system response shown in FIG. 7 has been found to produce audibly good results on available 192 kHz recordings. Indeed the decoded signal has sometimes sounded better than conventional playback of the 192 kHz stream without downsampling, a result that could be attributed to the attenuation by the downsampling filter of any ringing near 96 kHz already present in the 192 kHz stream.

Alias Trading Based on Noise Spectrum Analysis

Much commercial source material has a noise floor that rises in the ultrasonic region because of the behaviour of analogue-to-digital converters and noise shapers. For example, the spectrum of a commercially available 176.4 kHz transcription of the Dave Brubeck Quartet's "Take 5", shown as the upper trace in FIG. 8, reveals a noise floor that increases by 42 dB between 33 kHz and 55 kHz, these frequencies being equidistant from the foldover frequency of 44.1 kHz when downsampled. If there were no filtering before decimation, the resulting 88.2 kHz stream would have noise at 33 kHz composed almost entirely of noise aliased from and would thereby have a spectral density some 42 dB higher than in the 175.4 kHz presentation of the recording.

The downsampling filter of FIG. 5B, if operated at 176.4 kHz instead of 192 kHz, would provides gain of +2.3 dB and −6.7 dB at 33 kHz and 55 kHz respectively, a difference of 9 dB. Downsampling "Take 5" with this filter, components aliased from would still dominate original 33 kHz components by 33 dB. The alternative downsampling filter of FIG. 5A provides 16.8 dB discrimination between these two frequencies, resulting in aliased components 25 dB higher than the original components. For this is a somewhat exceptional case, filters (to be described) having still larger discrimination might be preferable; nevertheless the filter of figure has been found satisfactory in many cases, and to provide better audible results than the filter of FIG. 5B. Thus placing the correction filter in the decoder, as in option (c) discussed earlier, seems preferable to placing it in the encoder, option (b).

The above discussion has concentrated on downward aliased signal components, but it should be noted that putting the correction filter in the decoder will have the effect of boosting upward aliased components. It is a matter of trading downward aliasing against upward aliasing, and for downsampling from 192 kHz to 96 kHz, or from 176.4 kHz to 88.2 kHz it seems audibly better to reduce downward aliasing even if upward aliasing thereby increased.

There is no established criterion for how much aliased components should be reduced relative to original components, but a criterion may be derived based on balancing phase distortion in the audio band against total noise. We assume that the total response should be minimum-phase in order to avoid pre-responses. The flattening filter is always designed to give an total amplitude response flat to fourth order but Bode's phase-shift theorems tell us that when ultrasonic attenuation is introduced, phase distortion is inevitable in a minimum-phase system. When the phase response is expanded as a series in frequency, only odd powers are present. The linear term is irrelevant since it is equivalent to a time delay, hence the cubic term is dominant. If now additional attenuation δg decibels is introduced over a frequency interval of centred on frequency f, we can deduce from Bode's theorems that the resulting addition to the cubic term in the phase response will be proportional to $\delta g \cdot \delta f / f^4$. From the inverse fourth power dependence on f we can deduce that for lowest total noise consistent with a given phase distortion and a given end-to-end frequency response, the upward and downward aliasing should be balanced so that the ratio of the original noise power to the aliased noise power is equal to the inverse fourth power of the ratio of the two frequencies involved.

In the case of downsampling to 96 kHz, this criterion implies that the noise spectral density at 36 kHz that results from original 60 kHz noise should be 8.9 dB below the noise spectral density at 36 kHz in the original 192 kHz sampled signal. Also, at the foldover frequency of 48 kHz, the spectrum of the noise after filtering by the downsampling filter should optimally have a slope of −12 dB/8ve. It follows that the slope of the downsampling filter of FIG. 5A is not sufficient in the case of "Take 5" according to this criterion, and a downsampling filter with a steeper slope near 48 kHz is indicated if this criterion is considered relevant. "Take 5" is somewhat exceptional but the spectrum of "Brothers in Arms" by "Dire Straits", also shown in FIG. 8, also has a high slope near the foldover frequency.

Flattening the Downsampled Signal

As discussed, aliasing considerations often suggest that that the downsampling filter be not flattened, flattening being postponed to a subsequent upsampler. The transmitted signal will thereby not have a flat frequency response, which may be a disadvantage for interoperability with legacy equipment that does not flatten.

Figure 9:
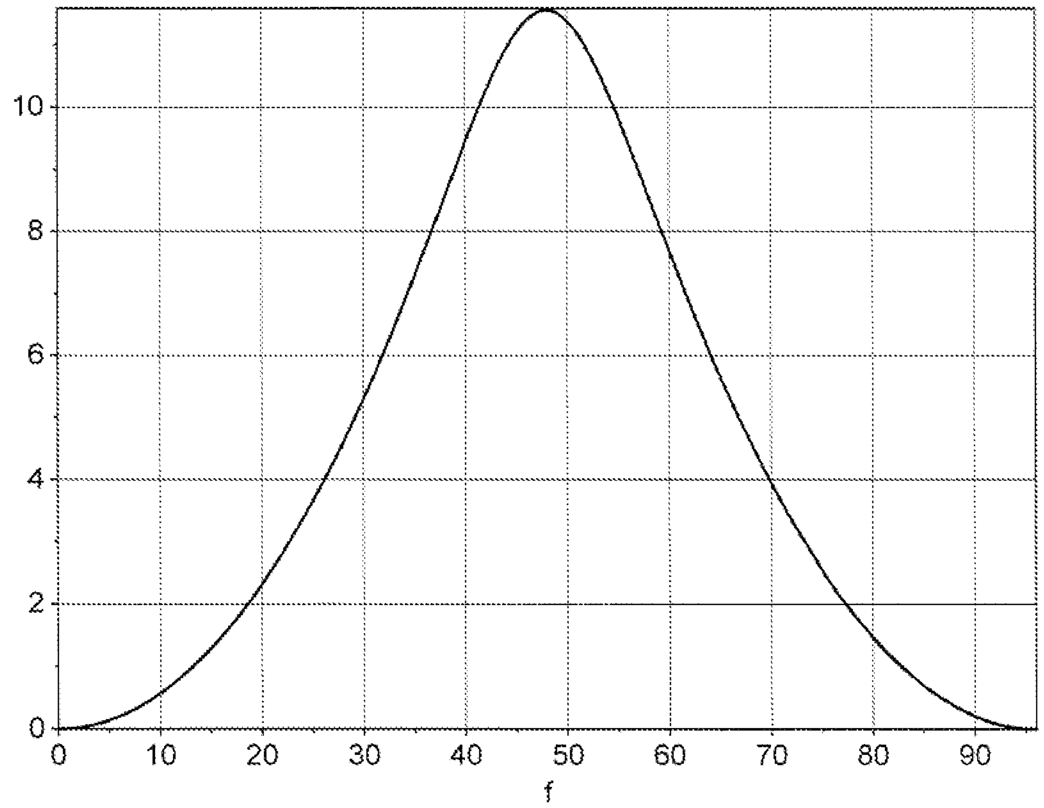
FIG. 9 shows the response of a flattening filter symmetrical about 48 kHz for use with the downsampling filter of FIG. 5B.
Figure 10:
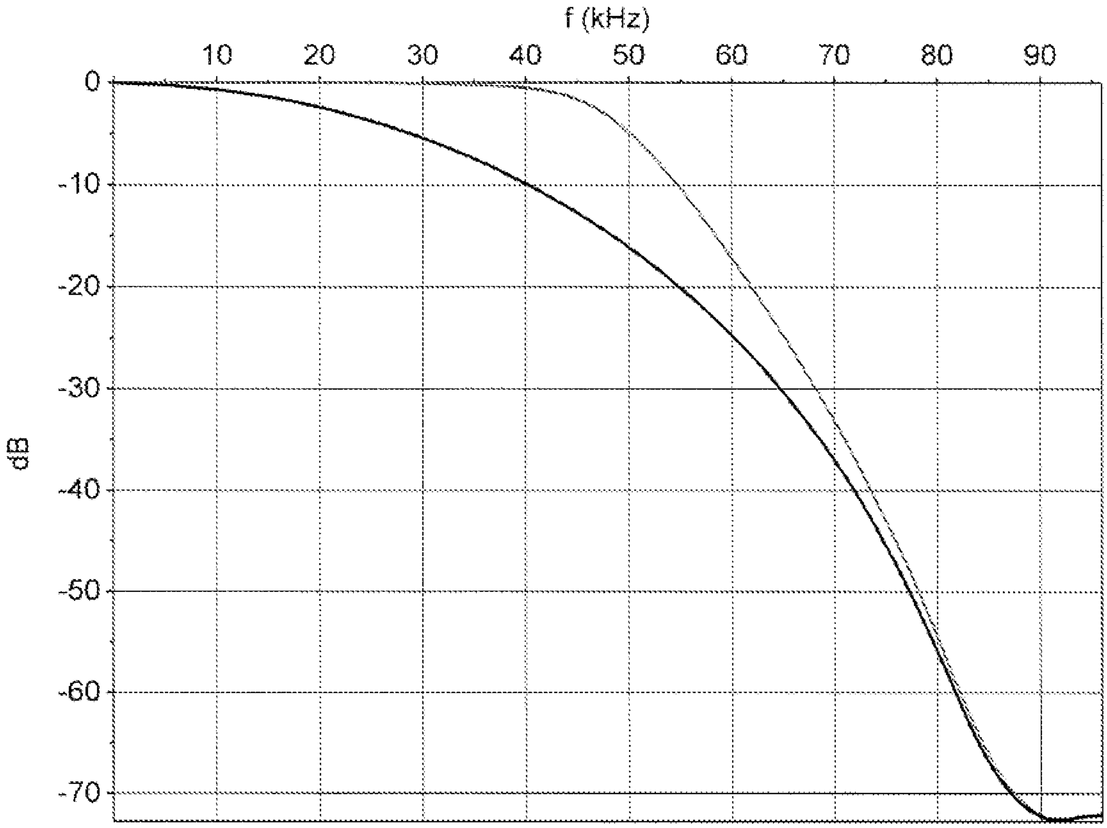
FIG. 10 shows (lower curve) the response of the downsampling filter of FIG. 5A and (upper curve) the response after flattening using the symmetrical flattener of FIG. 9.

A way to avoid the disadvantage without affecting the alias property of the downsampler is to flatten using a filter with a response such as shown in FIG. 9 that is symmetrical about the transmission Nyquist frequency, i.e. half the transmission sample frequency. The transmission Nyquist frequency is 48 kHz if downsampling from 192 kHz to 96 kHz, giving the unflattened and flattened downsampling responses are shown in FIG. 10.

The reason that the disadvantage is avoided is that the 'legacy flattener' is a symmetrical filter that treats each frequency and its alias image equally. The two frequencies are boosted or cut in the same ratio so the ratio of upward to downward aliasing in a subsequent decimation is not affected.

The response shown in FIG. 9 is in fact the response of the filter:

$$\frac{1.660575124}{1+0.6108508622z^{-2}+0.04972426151z^{-4}}$$

which is minimum-phase all-pole and contains only even powers of z. Filtering with this filter prior to decimation-by-2 is equivalent to filtering the decimated stream using the all-pole filter:

$$\frac{1.660575124}{1+0.6108508622z^{-1}+0.04972426151z^{-2}}$$

which is a process that can be reversed in a decoder, for example by applying a corresponding inverse filter:

$$0.6022009998(1+0.6108508622z^{-1}+0.04972426151z^{-2})$$

to the received decimated signal prior to upsampling. Thus, z-plane poles in the encoding filter are cancelled by zeroes in the decoder. In the time domain, any ringing caused by the legacy flattener in the encoder is quenched by the corresponding 'legacy unflattening' in the decoder, and this is one of the ways in which the total impulse response of the combination of encoder and decoder is more compact than that of the encoder alone.

After upsampling, a decoder can apply a psychoacoustically optimal flattener at the higher sample rate, just as if there were no legacy flattener. It is thus completely transparent that that the decimated signal has been flattened and then unflattened again.

The 'legacy unflattener' can alternatively be implemented after upsampling, using:

$$0.6022009998(1+0.6108508622z^{-2}0.04972426151z^{-4})$$

at the higher sampling rate. As this is an FIR filter, it may well be convenient to merge it with the upsampling filter and the end-to-end flattener. In this case the legacy unflattener may not be a separately identifiable functional unit. Thus, for both the legacy flattener and the legacy unflattener there is the option of implementation at the transmission sample rate or at the higher sample rate, in the latter case using a filter whose response is symmetrical about the transmission Nyquist frequency. In this document these two implementation methods are considered equivalent and a reference to just one of them may be taken to include the other. Moreover if implemented at the higher rate the flattener or unflattener may be merged with other filtering, though its presence may be deduced if the z-transform of, respectively, the total decimation filtering or the total reconstruction filtering has z-transform factors that contain powers of z" only where n is the decimation or interpolation ratio.

It is not required that the legacy flattener be all-pole: it could be FIR or a general IIR filter provided its response is symmetrical about the transmission Nyquist frequency. For example the FIR filter:

$$1.444183138-0.5512608378z^{-1}+0.1190498978z^{-2}-0.01197219763z^{-3}$$

could be applied after decimation in an encoder and its inverse prior to upsampling in a decoder, this third-order FIR filter being similarly effective to the second-order all-pole filter of FIG. 9 in flattening the transmitted signal. In this case the decoder would have poles that cancel zeroes in the encoder. This FIR flattener could alternatively be implemented prior to decimation using:

$$1.444183138-0.5512608378z^{-2}+0.1190498978z^{-4}0.01197219763z^{-6}$$

and in this form it could be merged with the downsampling filter and so not be identifiable as a separate functional unit.

While the legacy flattener has here been explained in the context of a 2:1 downsampling, the same principles apply in the case of an n:1 downsampling, where the legacy flattening and unflattening may be performed at the transmission sample rate using a general minimum-phase filter and its inverse, or it may be performed at the higher sample rate using a filter containing powers of $z^n$ only. In both cases the legacy flattener has a decibel response that is symmetrical about the transmission Nyquist.

Having noted that an invertible symmetrical filter applied at the original sample rate makes no difference to the alias characteristics of the filtering and that its effect can be reversed completely in a decoder, it follows that in comparing the suitability of one candidate downsampling filter with another, symmetrical differences in the decibel response are irrelevant. Hence we decompose the decibel response dB (f) of a given filter into a symmetric component:

$$\frac{dB(f)+dB(fs_{trans}-f)}{2}$$

and an asymmetric component:

$$\frac{dB(f)+dB(fs_{trans}-f)}{2}$$

where f is frequency, $fs_{trans}$ is the transmission sampling frequency, and a comparing between two downsampling filters we concentrate on the asymmetric component, leaving the symmetric component to be adjusted if necessary in a decoder. The asymmetric component is, in fact, half of the alias rejection:

$$\text{alias rejection}=dB(f)-dB(fs_{trans}-f)$$

Infra-Red Coding

We refer to the paper by Dragotti P. L., Vetterli M. and Blu T.: "Sampling Moments and Reconstructing Signals of Finite Rate of Innovation: Shannon Meets Strang-Fix", IEEE Transactions on Signal Processing, Vol. 55, No. 5, May 2007. Section III A of this paper considers a signal consisting of a stream of Dirac pulses having arbitrary locations and amplitudes, and the question is asked of what sampling kernels can be used so that the locations and amplitudes of the Dirac pulses may be deduced unambiguously from a uniformly sampled representation of the signal.

Figure 11:
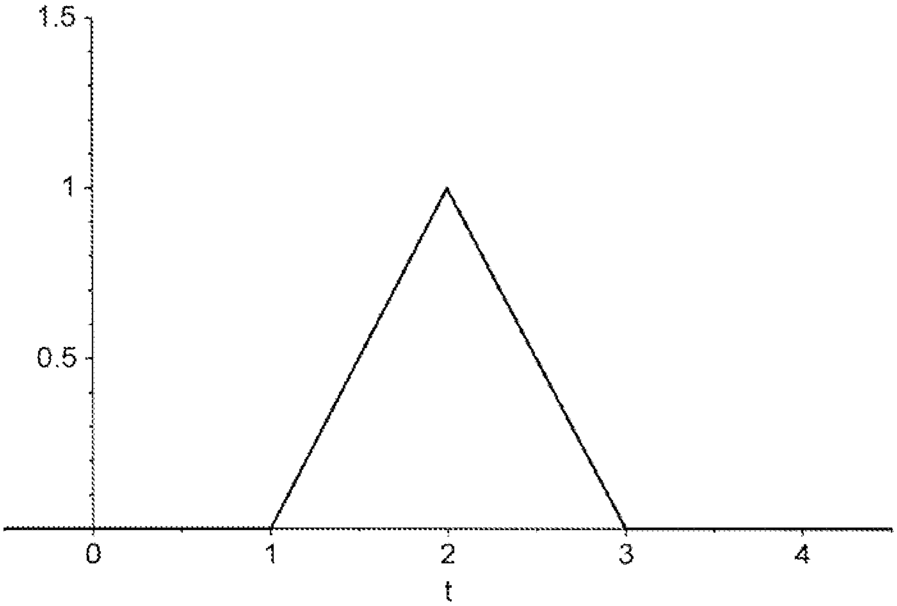
FIG. 11 shows a linear B-spline sampling kernel.

We consider that this question may be relevant to the reproduction of audio, in that many natural environmental sounds such as twigs snapping are impulsive and it is by no means clear that a Fourier representation is appropriate for this type of signal. The linear B-spline kernel shown in FIG. 11 is the simplest polynomial kernel that will enable unambiguous reconstruction of the location and amplitude of a Dirac pulse. We have given the name "infra-red coding" to a downsampling specification based these ideas.

In downsampling, we start with a signal that is already sampled but the conceptual model is that this is a continuous time signal, in which the original samples are presented a sequence of Dirac pulses. The continuous time signal is convolved with a kernel and resampled at the rate of the downsampled signal. Referring to FIG. 11, the resampling instants are the integers 0, 1, 2, 3 etc while the original signal is presented, on a finer grid. Assuming that the original samples and resampling instants are aligned, then the continuous time convolution with the linear B-spline followed by resampling is equivalent to a discrete-time convolution with the following sequences prior to decimation:

| | |
|---|---|
| (1, 2, 1)/4 | for decimation by 2 |
| (1, 2, 3, 2, 1)/9 | for decimation by 3 |
| (1, 2, 3, 4, 3, 2, 1)/16 | for decimation by 4 |
| . . . | |
| (1, 2, 3, 4, 5, 6, 7, 8, 7, 6, 5, 4, 3, 2, 1)/64 | for decimation by 8. |

These sequences are merely samplings at the original sampling rate of the B-spline kernel. Since the kernel has a temporal extent of two sample periods at the downsampled rate, in all cases the downsampling filter will have a temporal extent not exceeding two sample periods at the downsampled rate.

Thus for decimation by 2 the downsampling filter would have z-transform ($\frac{1}{4}+\frac{1}{2}z^{-1}+\frac{1}{4}z^{-2}$). We have found that very satisfactory results can be obtained using this filter for downsampling in combination with the same filter, suitably scaled in amplitude, for upsampling, with also a suitable flattener, which can be placed after upsampling, or merged with the upsampler. For downsampling from 176.4 kHz to 88.2 kHz the combined downsampling and upsampling droop of 2.25 dB @ 20 kHz can be reduced to 0.12 dB using a short flattener such as:

$$2.1451346747-1.4364916731z^{-1}\pm0.2913569984z^{-2} \text{ at } 176.4 \text{ kHz.}$$

The total upsampling and downsampling response is then FIR with just 7 taps, hence a total temporal extent of six sample periods at the 176.4 sample rate or three sample periods at the downsampled rate. This is the shortest total filter response known to us that is often audibly satisfactory and maintains a flat response over 0-20 kHz.

The infra-red prescription does not provide the strong rejection of downward aliasing considered desirable for signals with a strongly rising noise spectrum but there are many commercial recordings whose ultrasonic noise spectra are more nearly flat or are falling. With a downsampling ratio of 2:1 the slope of an infra-red downsampling filter is −9.5 dB/8ve at the downsampled Nyquist frequency; with a ratio of 4:1 it is −11.4 dB/8ve and in the limiting case of downsampling from continuous time it is −12 dB/8ve. This compares with a slope of −22.7 dB/8ve for the downsampling filter of FIG. 5A and for this type of source material the infra-red encoding specification may not be suitable.

An encoder for routine professional use should ideally attempt to determine the ultrasonic noise spectrum of material presented for encoding, for example by measuring the ultrasonic spectrum during a quiet passage, and thereby make an informed choice of the optimal downsampling and upsampling filter pair to reconstruct that particular recording. The choice then should be communicated as metadata to the corresponding decoder, which can then select the appropriate upsampling filter.

The above discussion has concentrated substantially on downsampling from a '4×' sampling rate such as 192 kHz or 176.4 kHz to a '2×' sampling rate such as 96 kHz or 88.2 kHz, but of commercial importance also is downsampling from a 4× or a 2× sampling rate to a 1× sampling rate such as 48 kHz or 44.1 kHz. In fact the same 'infra-red' coefficients $\frac{1}{4}+\frac{1}{2}z^{-1}+\frac{1}{4}z^{-2}$ as discussed above for use at higher sampling rates have also been found to provide audibly good results when downsampling from 88.2 kHz to 44.1 kHz. This is perhaps surprising as one might have expected that the ear would require greater rejection of downward aliased images of original frequencies at this lower sample rate, but repeated listening tests have confirmed that this does not seem to be the case. The same filter can be used for upsampling, combined with or followed by a flattener. At this lower sample rate, a flattener with more taps is needed, for example the filter:

$$4.0185-5.9764z^{-1}+4.6929z^{-2}-2.4077z^{-3}+0.8436z^{-4}-0.1971z^{-5}+0.02792z^{-6}-0.0018z^{-7}$$

running at 88.2 kHz, flattens the total response of downsampler and the upsampler to within 0.2 dB at 20 kHz and has found to be audibly satisfactory.

A flattener and unflattener pair can be provided as was described previously to allow compatibility with 44.1 kHz reproducing equipment. To provide a maximally flat response with a droop not exceeding 0.5 dB at 20 kHz, a nine-tap all-pole flattener implemented at 44.1 kHz is theoretically required:

$$\frac{1.2305}{1+0.2489z^{-1}-0.0231z^{-2}+0.0058z^{-3}-0.0015z^{-4}+0.0003z^{-5}-0.0001z^{-6}+0.8166\,10^{-5}z^{-7}-0.7262\,10^{-6}z^{-2}+0.3151\,10^{-8}z^{-9}}$$

though some of the later terms of the denominator here given could be deleted with minimal introduction of passband ripple. Either way, the expression here given can be inverted to provide a corresponding FIR unflattener. A high-resolution decoder would typically unflatten at 44.1 kHz, upsample to 88.2 kHz and then flatten using an optimally-designed flattener at 88.2 kHz such as the 7th order FIR flattener given above. In this case, the impulse response of the encoder and high-resolution decoder together has 12 nonzero taps, whereas the encoder alone has an impulse response that continues longer, albeit at lower levels such as −40 dB to −60 dB.

One or both of the flattening and unflattening filters presented here for operation at the 44.1 kHz rate could be transformed as indicated previously to provide the same functionality when operated at 88.2 kHz or a higher rate, if this is more convenient.

Figure 12A:
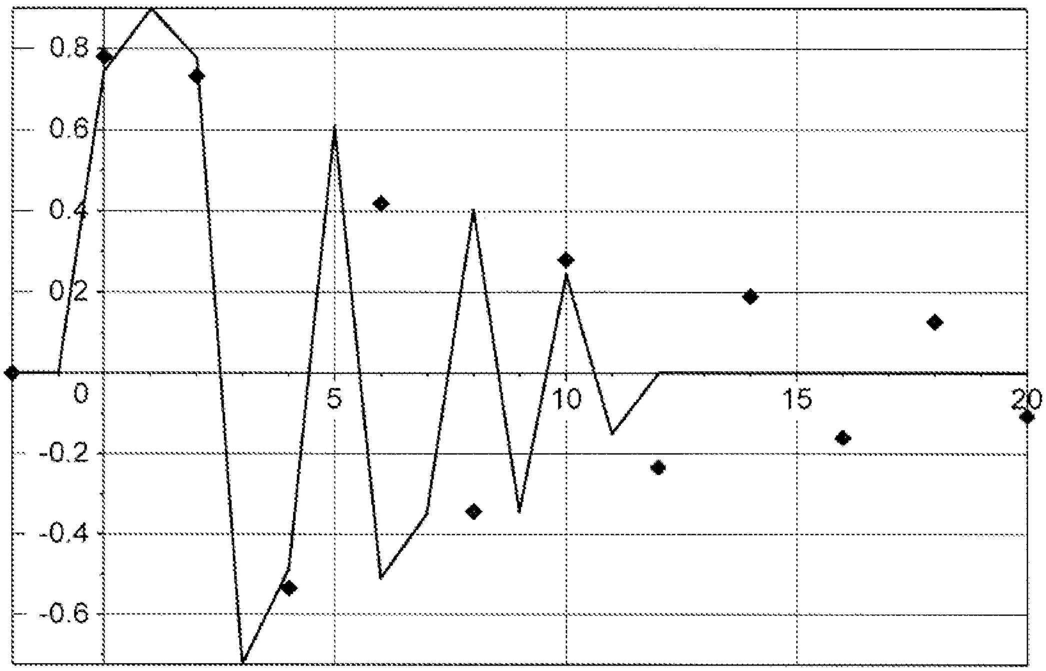
FIG. 12A illustrates impulse reconstruction at 88.2 kHz from 44.1 kHz infra-red encoded samples aligned with even samples of an original 88.2 kHz stream.
Figure 12B:
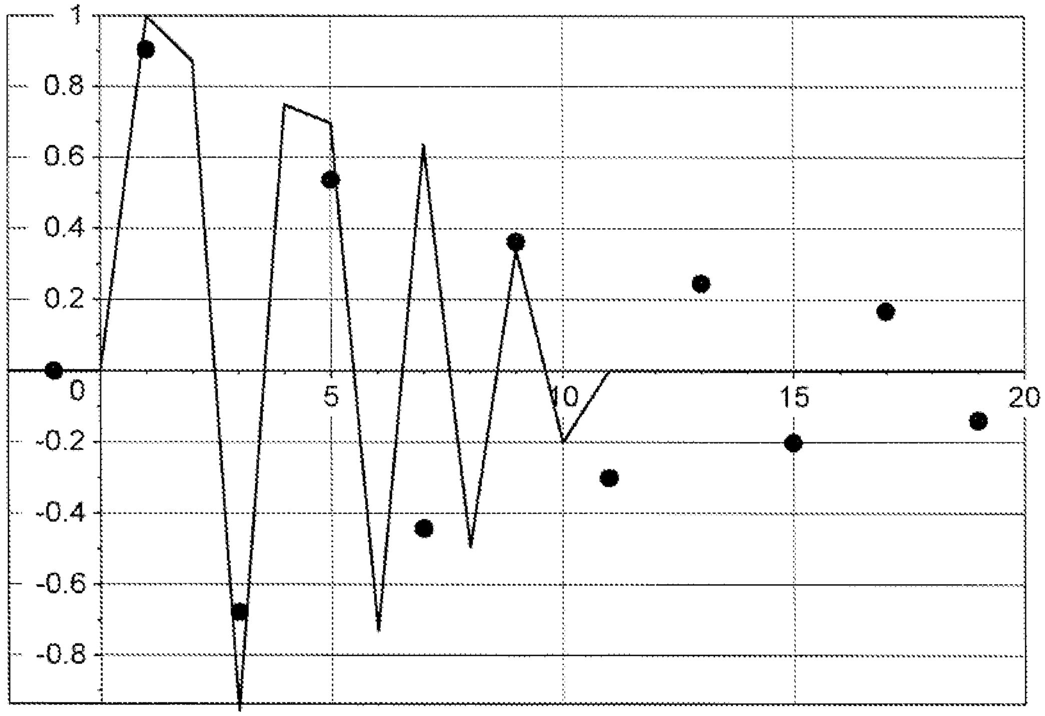
FIG. 12B illustrates impulse reconstruction at 88.2 kHz from 44.1 kHz infra-red encoded samples aligned with odd samples of an original 88.2 kHz stream.

Reconstruction as described above to continuous time from a 44.1 kHz infra-red coding of an impulse presented as a single sample at time t=0 within an 88.2 kHz stream is illustrated in FIGS. 12A and 12B. In FIG. 12A the reconstruction is from 44.1 kHz samples, shown as diamonds, coincident in time with even samples of the 88.2 kHz stream, whereas in FIG. 12B the reconstruction is from 44.1 kHz samples, shown as circles, coincident with odd samples of the 88.2 kHz stream points. The horizontal axes is time t in units of 88 kHz sample periods and the vertical axes shows amplitude raised to the power 0.21, which provides visibility of small responses but also may have some plausibility according to neurophysiological models of human hearing which suggest that for short impulses, peripheral intensity is proportional to amplitude raised to the power 0.21. The 44.1 kHz representations have been derived using the infra-red method as described above including flattening for compatibility with legacy equipment, while the two high-resolution reconstructions similarly use a legacy unflattener followed by infra-red reconstruction and a flattener implemented at 88.2 kHz.

It will be noted that the 44 kHz stream shows a time response that continues long after the high resolution reconstruction of the impulse has ceased, thus demonstrating the effectiveness of the pole-zero cancellation in providing an end-to-end response that is more compact than the response of the encoder alone.

FIGS. 12A and 12B also illustrate that the concept of an 'impulse response' needs to be defined more clearly when decimation is involved. In the case of decimation-by-2 the result is different for an impulse presented on an odd sample from that on an even sample. In this document we use the term 'impulse response' to refer to the average of the responses obtained in these two cases.

It will be appreciated that infra-red coding as described provides two z-plane zeroes at the sampling frequency of the downsampled signal, and in the case of a downsampling ratio greater than 2, at all multiples of that frequency. This may be considered the defining feature of infra-red coding.

Suppression of Downward Aliasing

Figure 8:
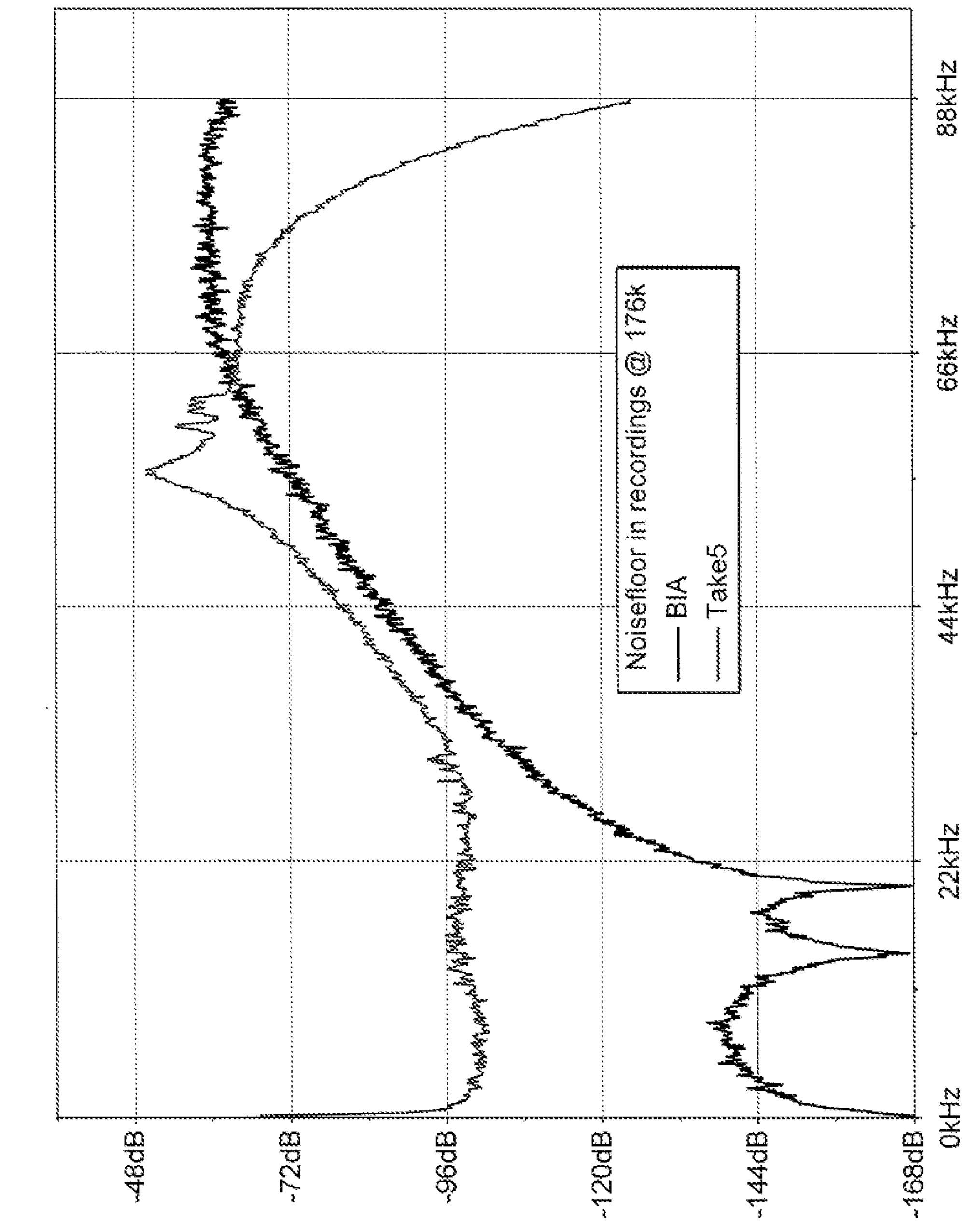
FIG. 8 shows the spectrum of two commercial recordings having a strongly rising ultrasonic response.

As noted, when encoding an item such as 'take 5", see FIG. 8, it may be desirable that the downsampling filter provide strong attenuation at frequencies such as 55 kHz where the noise spectrum peaks. It would be natural to think of placing one or more z-plane zeroes to suppress energy near this frequency. To do so would however increase the total length of the end-to-end impulse response: firstly because each complex zero requires a further two taps on the downsampling filter, and secondly because a zero near 55 kHz adds significantly to the total droop so a longer flattening filter will likely also be required.

Figure 13A:
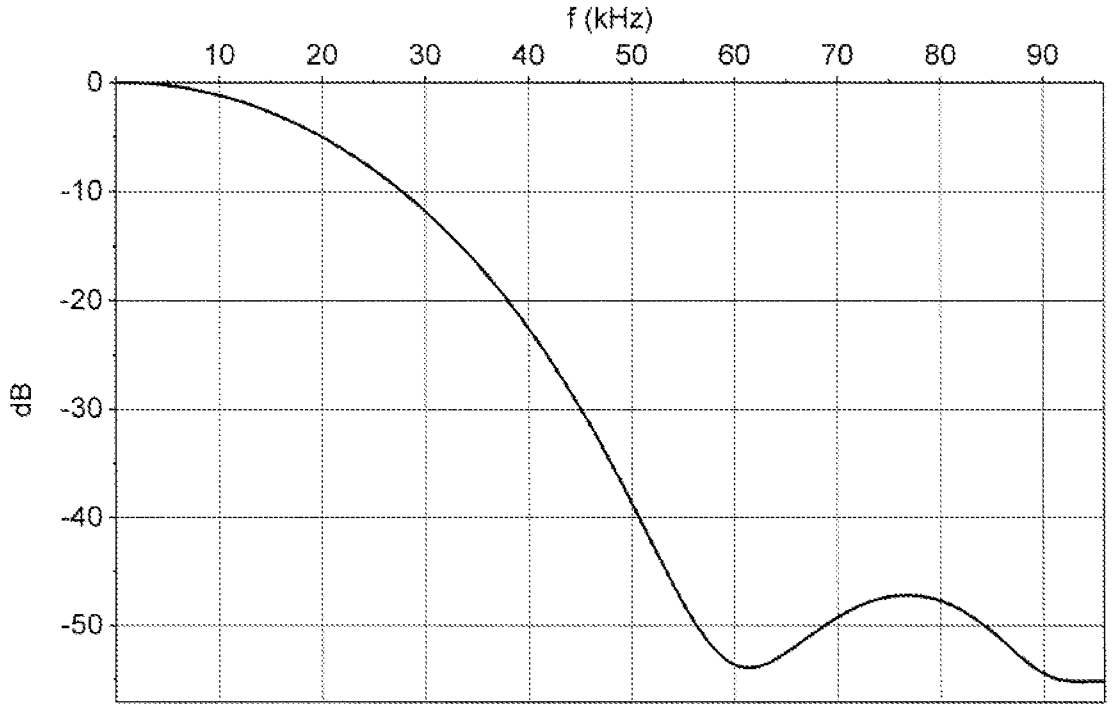
FIG. 13A shows the response of a downsampling filter having zeroes to provide strong attenuation near 60 kHz.
Figure 13B:
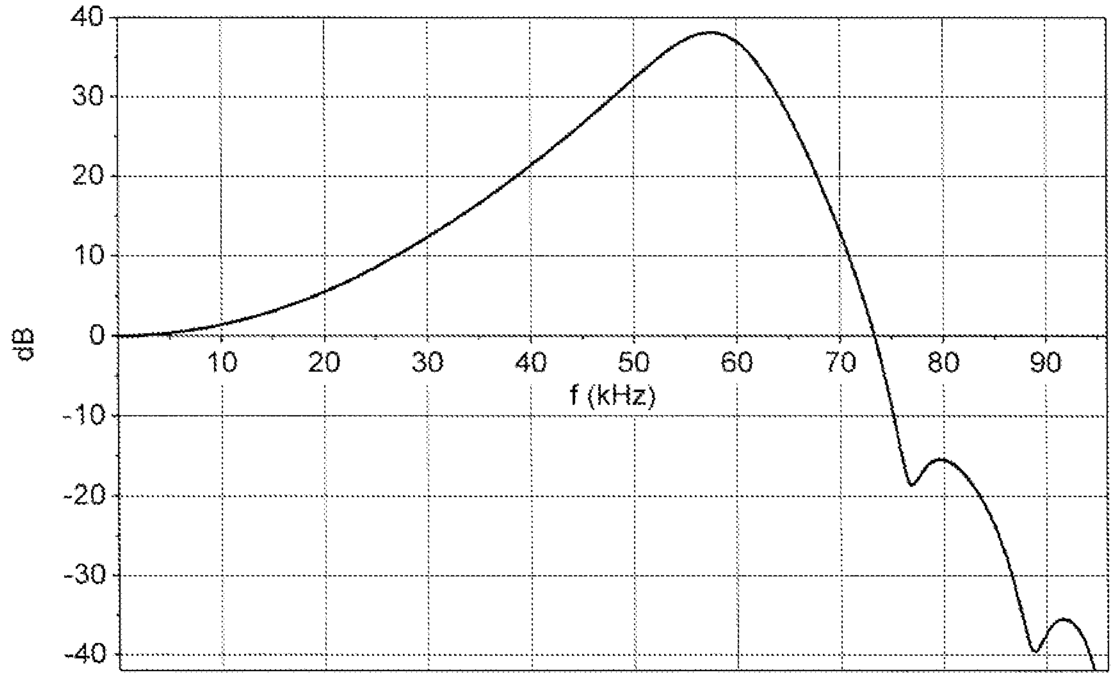
FIG. 13B shows the response of an upsampling filter having poles to cancel the effect on total response of the zeroes in the filter of FIG. 13A.
Figure 13C:
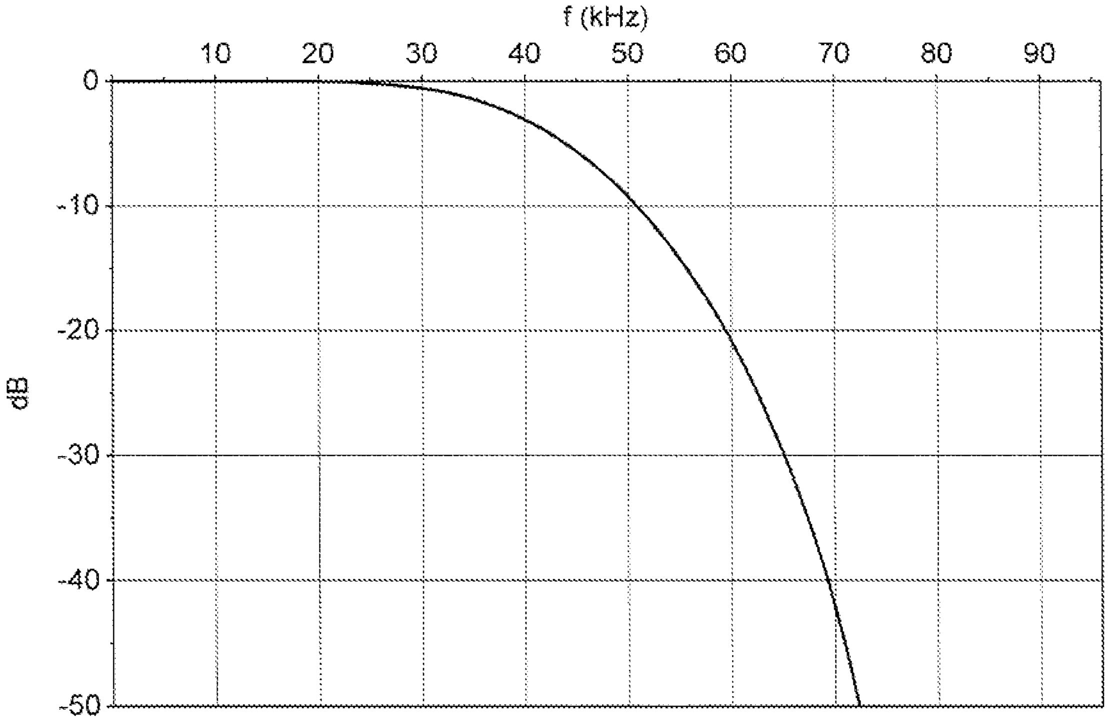
FIG. 13C shows the end-to-end response from combining the responses of FIG. 13A, FIG. 13B and an assumed external droop; and, FIG. 14 shows the normalised cumulative impulse response of the filter shown in FIG. 5A plotted against time in sample periods.
Figure 14:
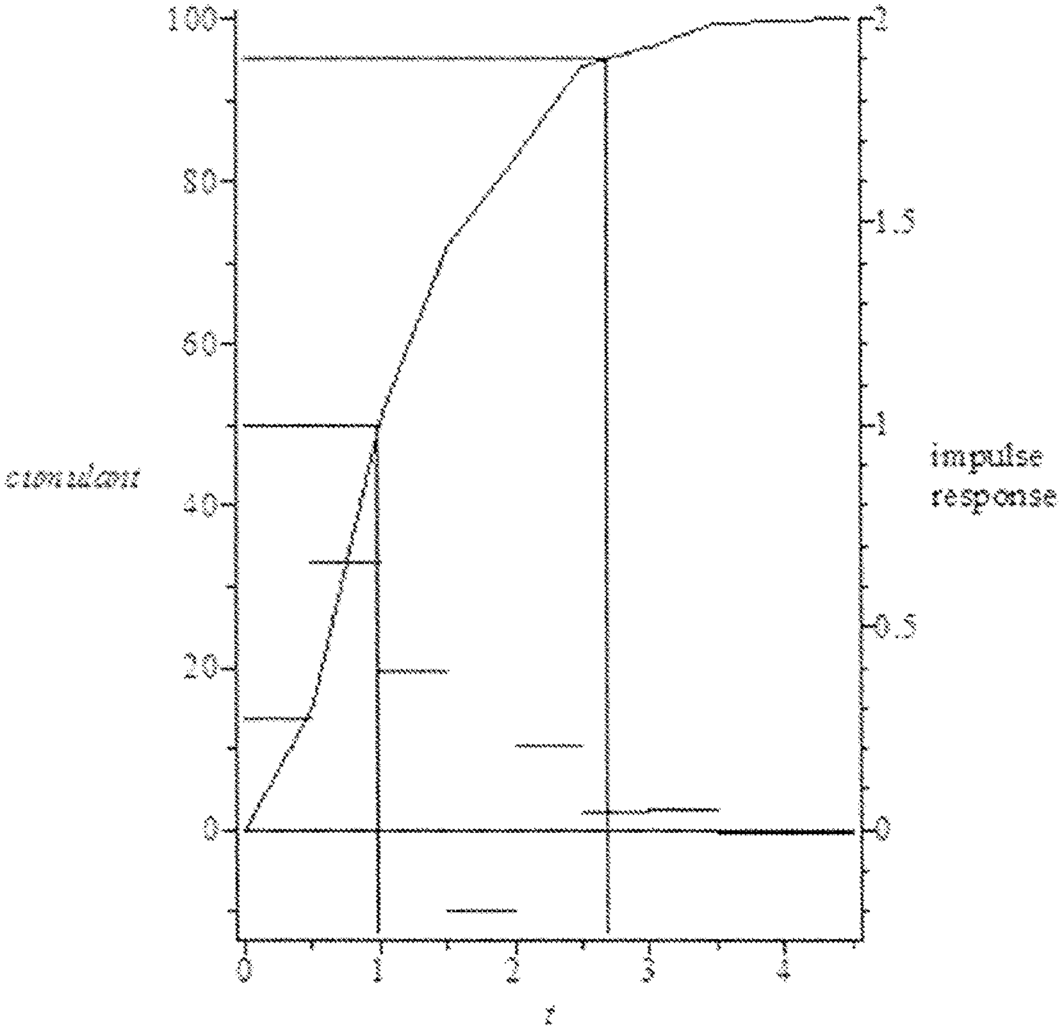

With one caveat, the increase in length can be avoided using pole-zero cancellation: the complex zero in the encoder's filter is cancelled by a pole in the decoder. In one embodiment, a downsampling filter incorporating three such zeroes is paired with an upsampling filter having three corresponding poles. The resulting downsampling and upsampling filter responses are shown in FIG. 13A and FIG. 13B and the end-to-end response from combining these two filters with an assumed external droop is shown in FIG. 13C. For consistency with other graphs, these plots assume a sampling rate of 196 kHz so the maximum attenuation is near 60 kHz rather than 55 kHz.

The caveat here is that although downward aliasing has been suppressed, upward aliasing has been increased. For use on tracks such as 'Take 5', the increased upward-aliased noise is well covered by the steeply-rising original noise. However signal components near 33 kHz would also result in much larger aliases near 55 kHz. It is thus arguably misleading simply to present an end-to-end frequency response that ignores aliased components; nevertheless it appears that the ear is relatively tolerant to the upward aliases provided the boost applied to the alias is not excessive.

The heavy boost of 38 dB at 57 kHz shown in FIG. 13B may seem at first unwise, but if a legacy flattener is used as described above then the decoder will incorporate a legacy unflattener which will compensate most of this boost, so the decoder as a whole will not exhibit the boost.

CONCLUDING REMARKS

It is to be noted that some of the decoding responses described in this document have features that would normally be absent from reconstruction filters. These features include a response that is rising rather than falling at the half-Nyquist frequency of 44.kkHz or 48 kHz, and a z-transform having one or more factors that are functions of even powers of z only, and thereby have individual responses that are symmetrical about the half-Nyquist frequency.

The invention claimed is:

1. An encoder adapted to furnish a digital audio signal at a transmission sample rate from a signal representing an audio capture, the encoder comprising:

a downsampler that comprises a downsampling filter coupled with a decimator, the downsampling filter having a frequency response having a double zero at each frequency of the digital audio signal that will alias to zero frequency and having a slope at the Nyquist frequency of the transmission sample rate that is more positive than minus thirteen decibels per octave.

2. An encoder according to claim 1, comprising a flattening filter having a symmetrical frequency response about the Nyquist frequency of the transmission sample rate.

3. An encoder according to claim 2, wherein the flattening filter has a pole in the z-plane.

4. An encoder according to claim 2, wherein the transmission sample rate is 44.1 kHz, and a frequency response droop of the encoder does not exceed 1 dB at 20 kHz.

5. An encoder according to claim 1, wherein the downsampler is configured to downsample an input signal:

from a four times, 4×, sample rate to a two times, 2×, sample rate of the input signal for transmission, or from a four times, 4×, sample rate to a one time, 1×, sample rate of the input signal for transmission, or from a two times, 2×, sample rate to a one time, 1×, sample rate of the input signal for transmission.

6. An encoder according to claim 5, wherein, respectively, the 4× sample rate is 192 KHz or 176.4 kHz, the 2× sample rate is 96 kHz or 88.2 kHz, and the 1× sample rate is 48 kHz or 44.1 kHz.

* * * * *